(12) United States Patent
Heyring et al.

(10) Patent No.: US 7,384,054 B2
(45) Date of Patent: *Jun. 10, 2008

(54) PASSIVE RIDE CONTROL FOR A VEHICLE SUSPENSION SYSTEM

(75) Inventors: Christopher B Heyring, Eagle Bay (AU); Michael J Longman, Dunsborough (AU)

(73) Assignee: Kinetic Pty. Ltd., Dunsborough, W.A. (AU)

( * ) Notice: Subject to any disclaimer, the term of this patent is extended or adjusted under 35 U.S.C. 154(b) by 268 days.

This patent is subject to a terminal disclaimer.

(21) Appl. No.: 10/890,451

(22) Filed: Jul. 13, 2004

(65) Prior Publication Data

US 2005/0001401 A1    Jan. 6, 2005

Related U.S. Application Data

(63) Continuation of application No. 09/958,685, filed as application No. PCT/AU00/00312 on Apr. 12, 2000, now Pat. No. 6,761,371.

(30) Foreign Application Priority Data

Apr. 12, 1999   (AU) .......................................... 9709
Apr. 23, 1999   (AU) .......................................... 9983

(51) Int. Cl.
    B60G 9/04    (2006.01)
(52) U.S. Cl. ......................... 280/124.157; 280/5.507; 280/5.508; 280/124.159
(58) Field of Classification Search ......... 280/124.106, 280/124.157, 124.159, 5.502, 5.508, 5.507; 701/37
See application file for complete search history.

(56) References Cited

U.S. PATENT DOCUMENTS

| | | | |
|---|---|---|---|
| 4,270,771 A | | 6/1981 | Fujii |
| 4,919,440 A | | 4/1990 | Tsukamoto |
| 5,193,845 A | * | 3/1993 | Yokote et al. ........... 280/5.503 |
| 5,475,593 A | | 12/1995 | Townend |
| 5,480,188 A | * | 1/1996 | Heyring ............... 280/124.104 |
| 5,562,305 A | * | 10/1996 | Heyring .................. 280/5.507 |
| 5,794,966 A | | 8/1998 | Maaleod |
| 5,915,701 A | | 6/1999 | Heyring |

(Continued)

FOREIGN PATENT DOCUMENTS

| | | |
|---|---|---|
| EP | 0 201 425 B1 | 3/1989 |
| EP | A 0 858 918 | 8/1998 |
| GB | 1 488 254 | 10/1977 |
| WO | A 95/23076 | 8/1995 |
| WO | A 98/18641 | 5/1998 |

*Primary Examiner*—Toan C To
(74) *Attorney, Agent, or Firm*—Harness, Dickey & Pierce, PLC

(57) ABSTRACT

A roll control system for a vehicle suspension system and a method for controlling said control system, the suspension system including support means, the roll control system including: wheel cylinders each including first and second chambers; and first and second fluid circuits, each said fluid circuit providing fluid communication between the said first chambers on one side of the vehicle and the second chambers on the opposite side of the vehicle by fluid conduits to thereby provide roll support decoupled from a warp mode of the vehicle suspension system by providing a roll stiffness about a level roll attitude whilst simultaneously providing substantially zero warp stiffness; and the method including bypassing fluid flow from at least a substantial portion of the conduits during predetermined wheel inputs to the control system to thereby minimize line damping and/or fluid inertia effects on the damping of the control system.

48 Claims, 24 Drawing Sheets

U.S. PATENT DOCUMENTS

| | | | |
|---|---|---|---|
| 6,010,139 A * | 1/2000 | Heyring et al. | 280/124.104 |
| 6,220,613 B1 * | 4/2001 | Franzini | 280/124.106 |
| 6,270,098 B1 | 8/2001 | Heyring et al. | |
| 6,318,742 B2 * | 11/2001 | Franzini | 280/124.106 |
| 6,519,517 B1 * | 2/2003 | Heyring et al. | 701/37 |
| 6,556,907 B1 * | 4/2003 | Sakai | 701/37 |
| 6,811,171 B2 * | 11/2004 | Sakai | 280/159 |
| 7,131,654 B2 * | 11/2006 | Sakai | 280/159 |

* cited by examiner

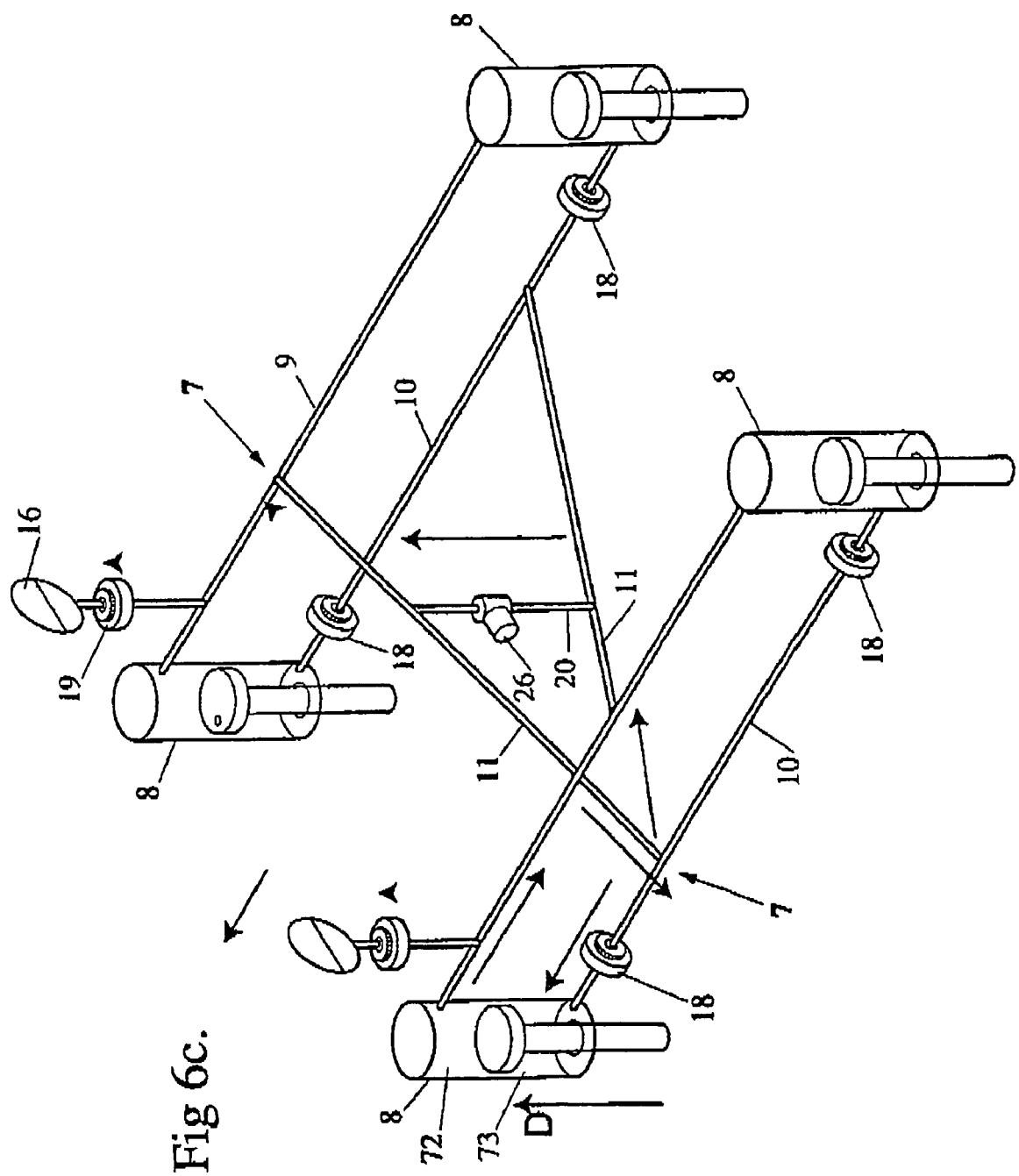

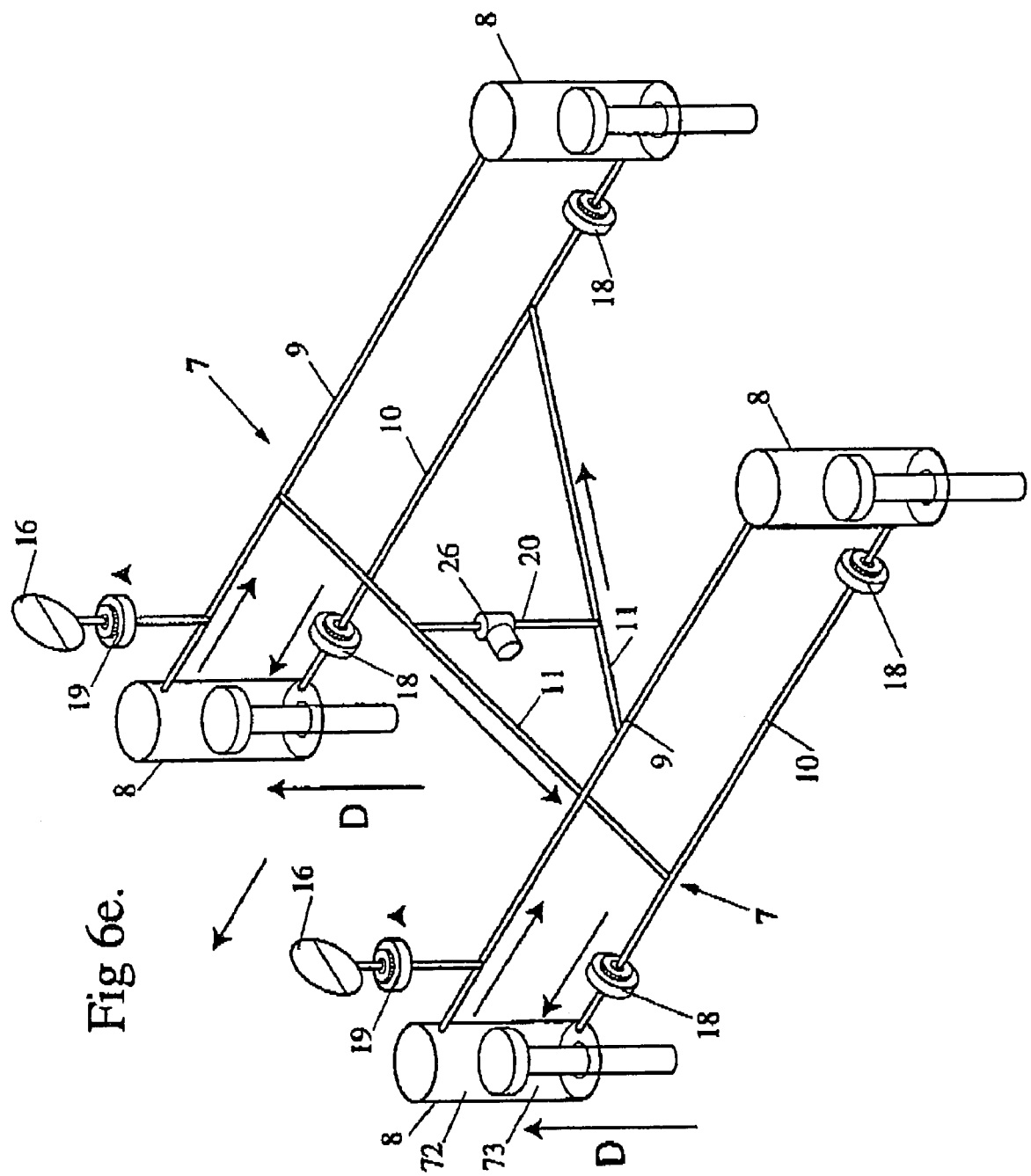

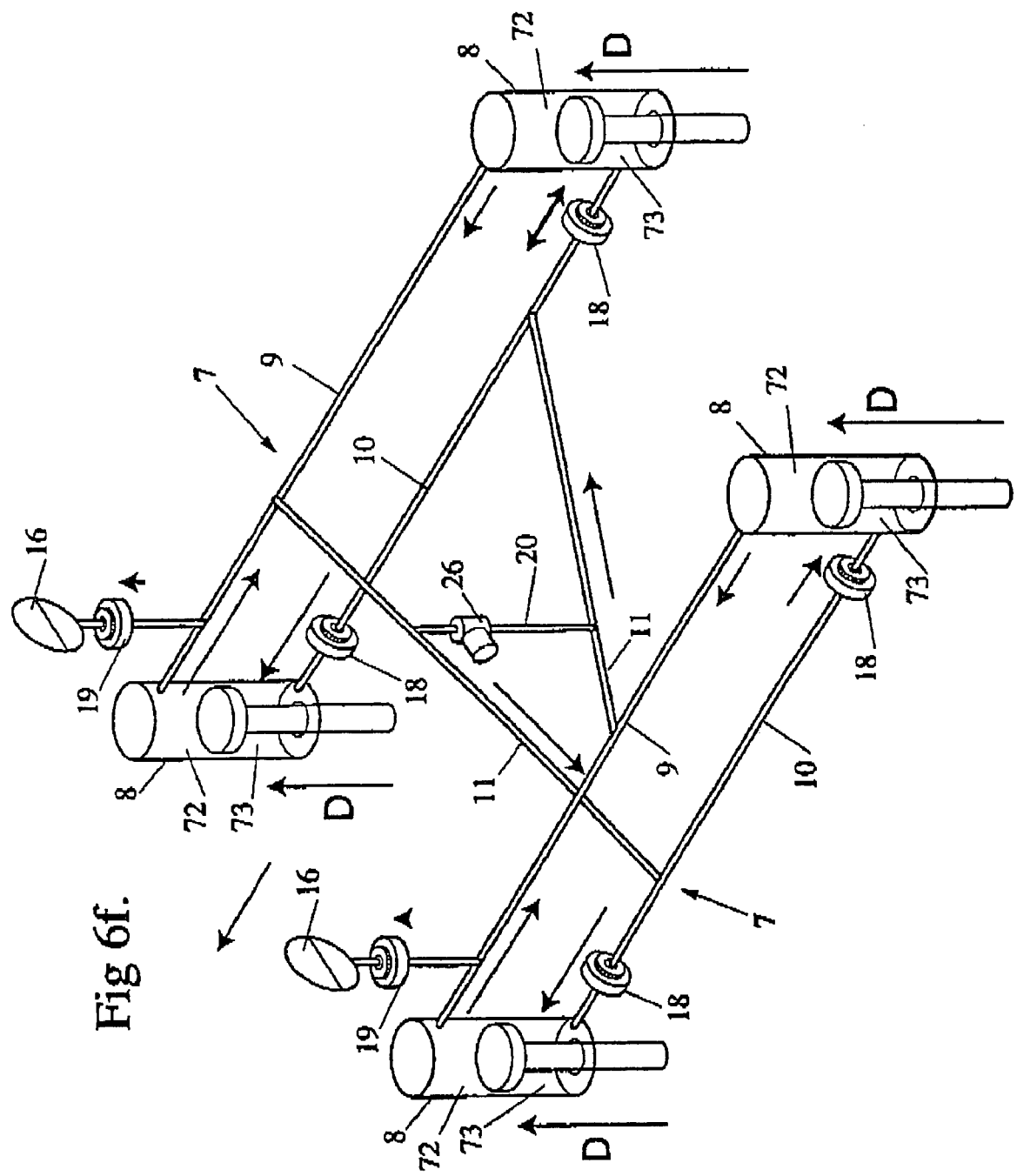

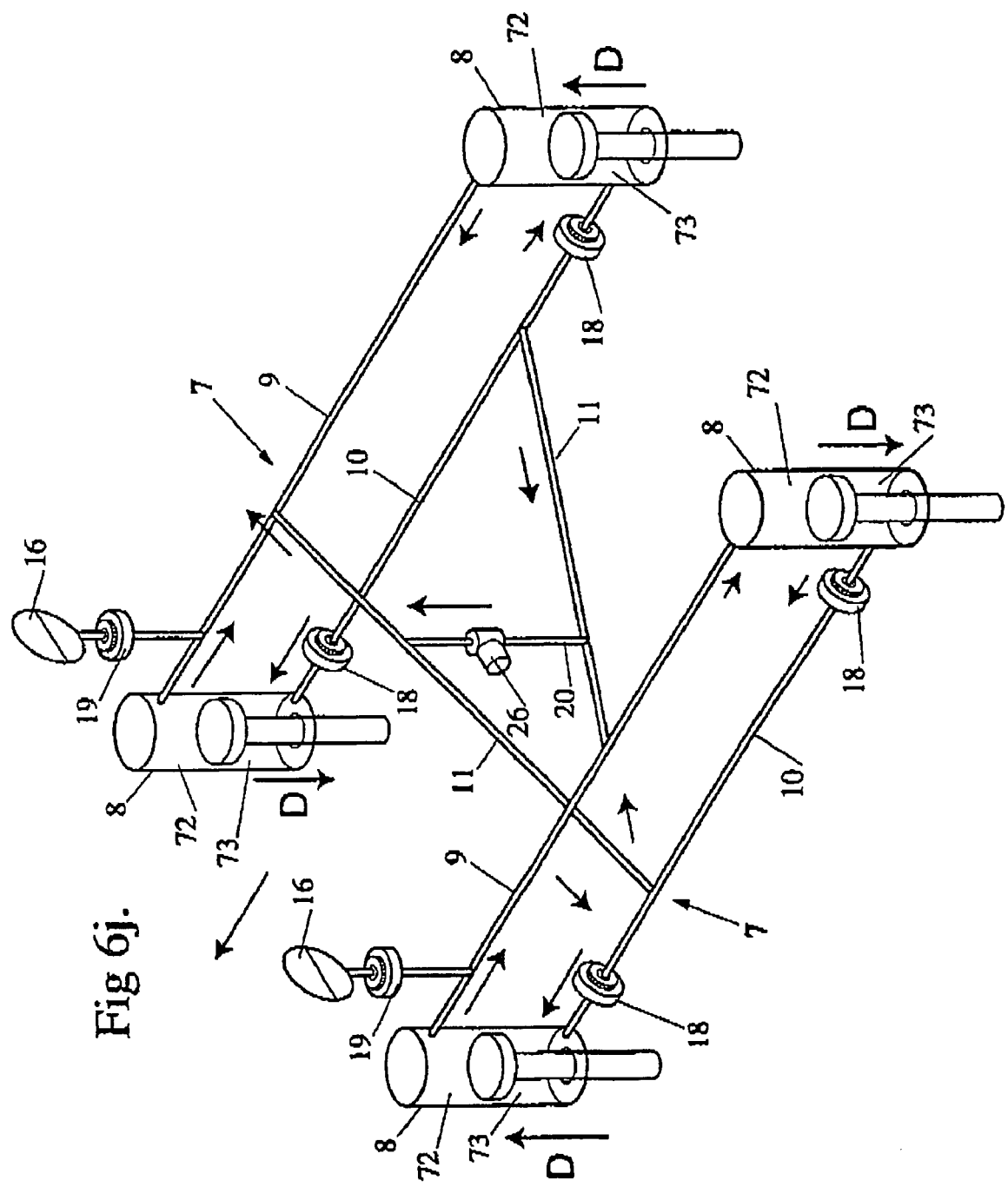

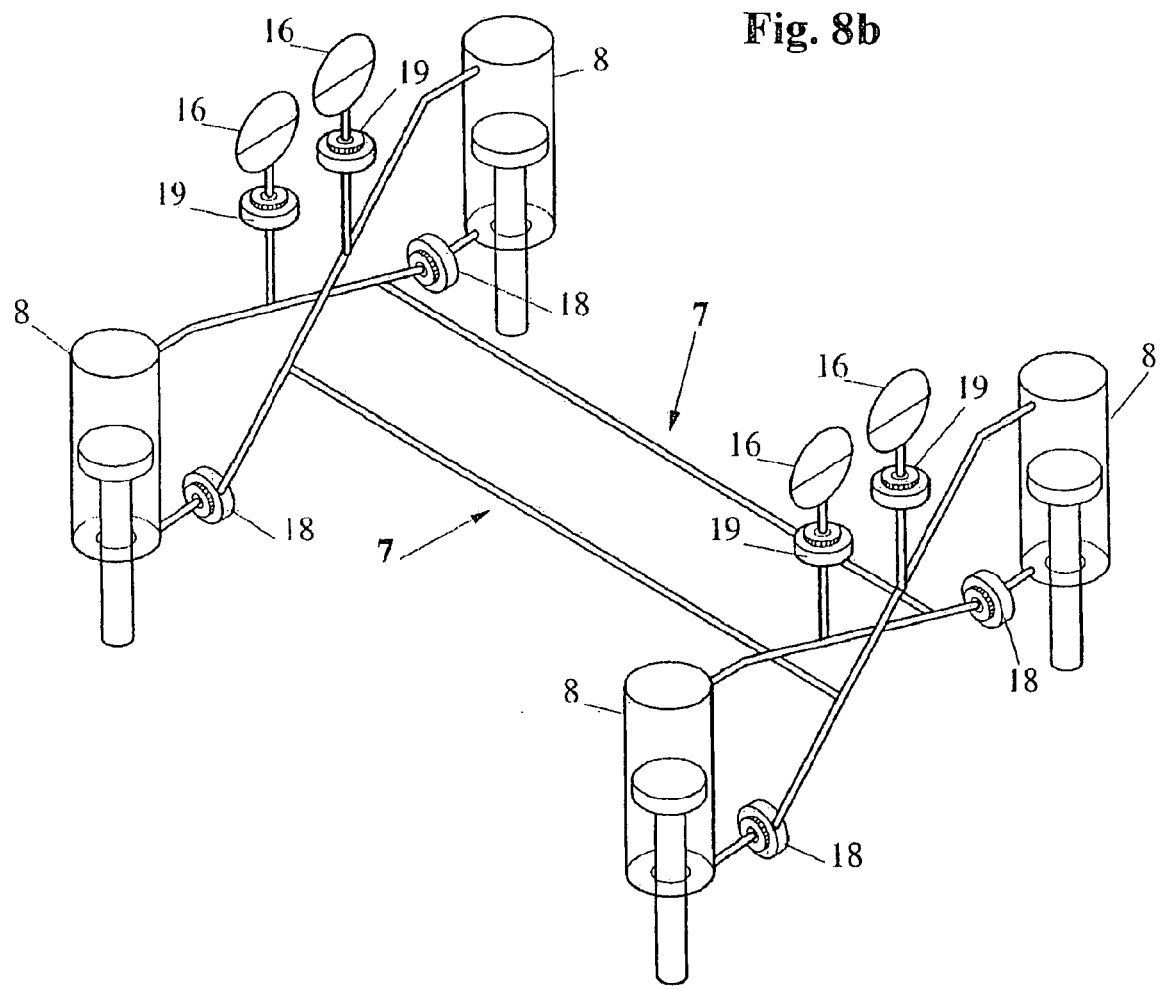

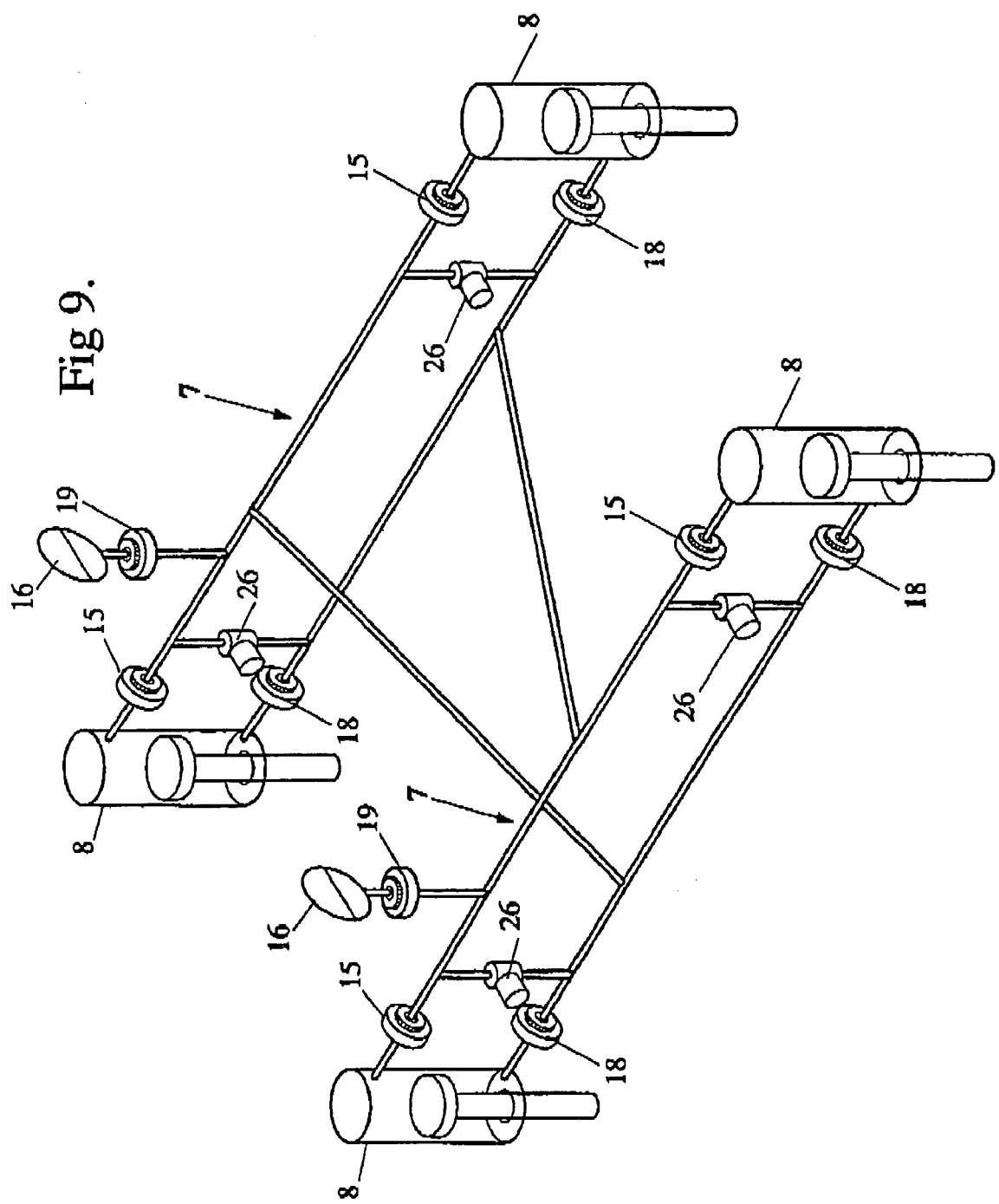

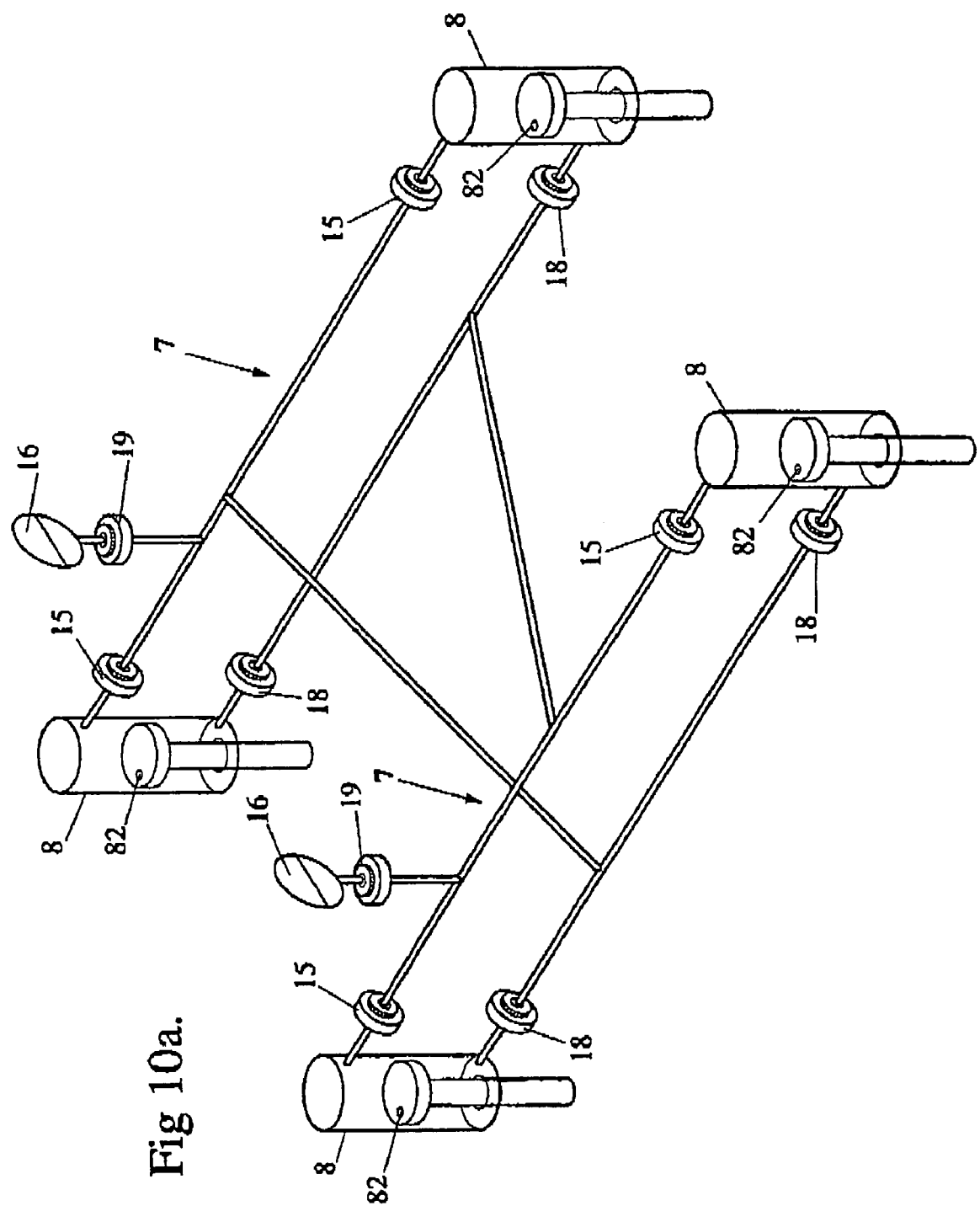

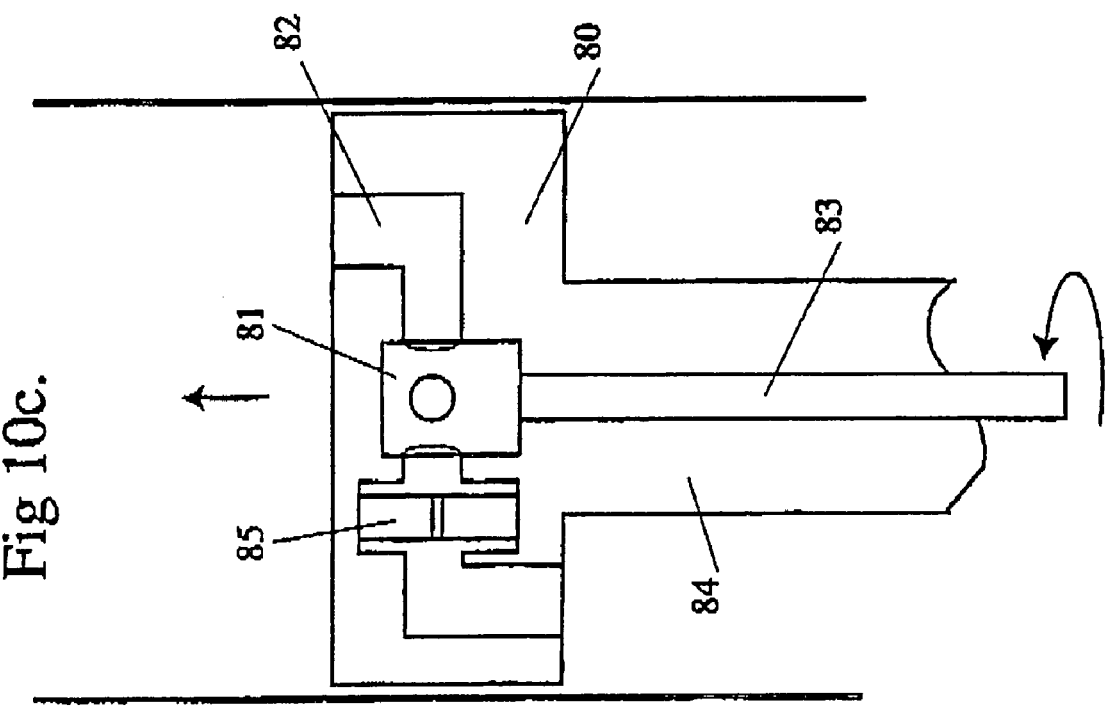
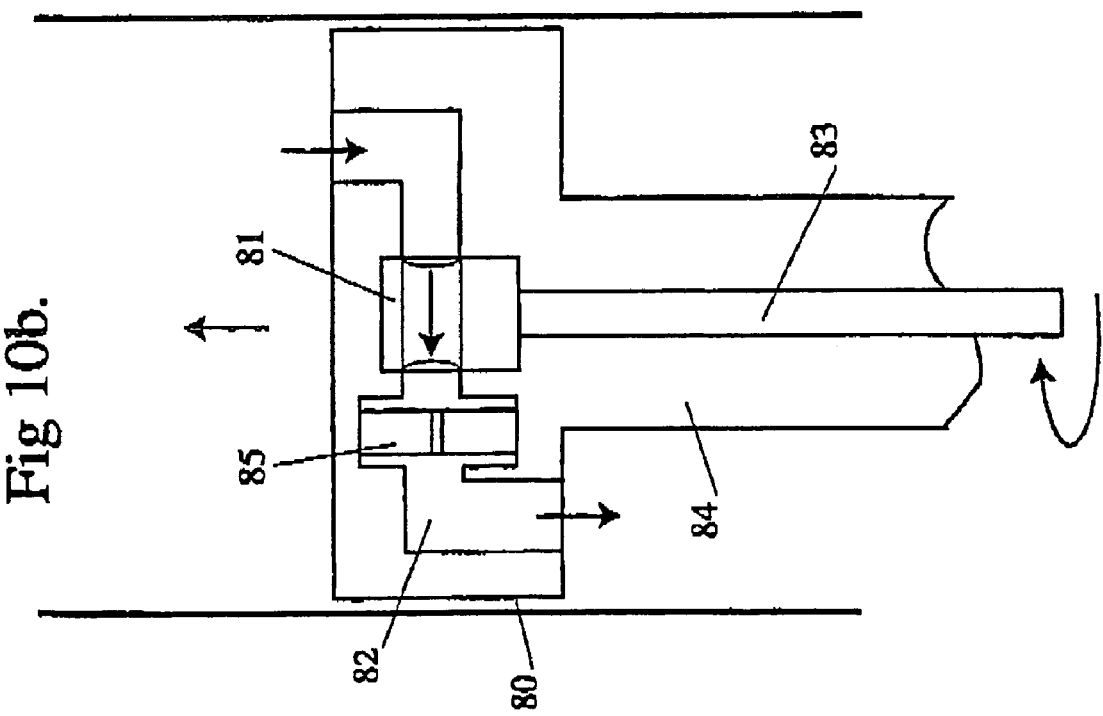

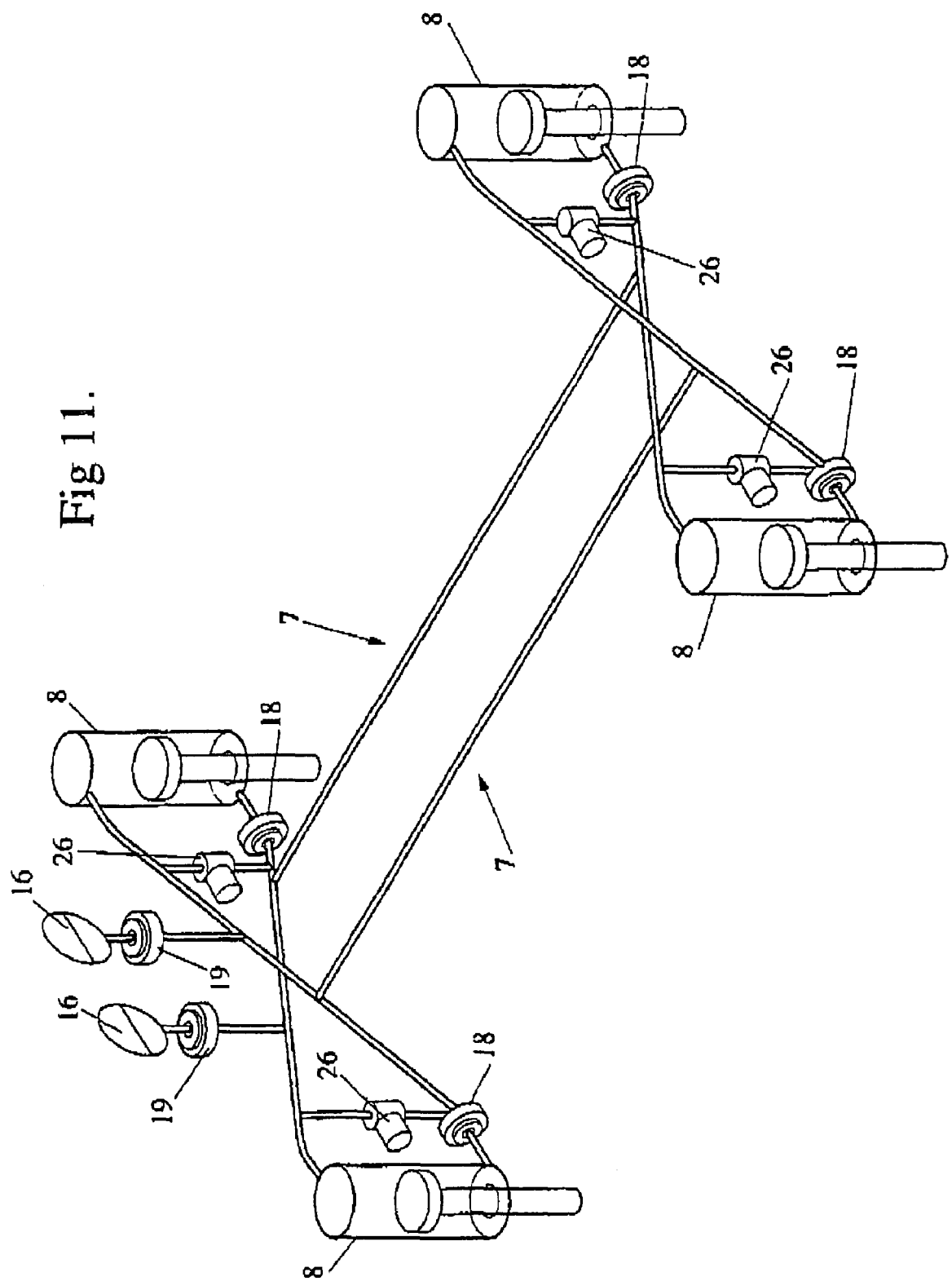

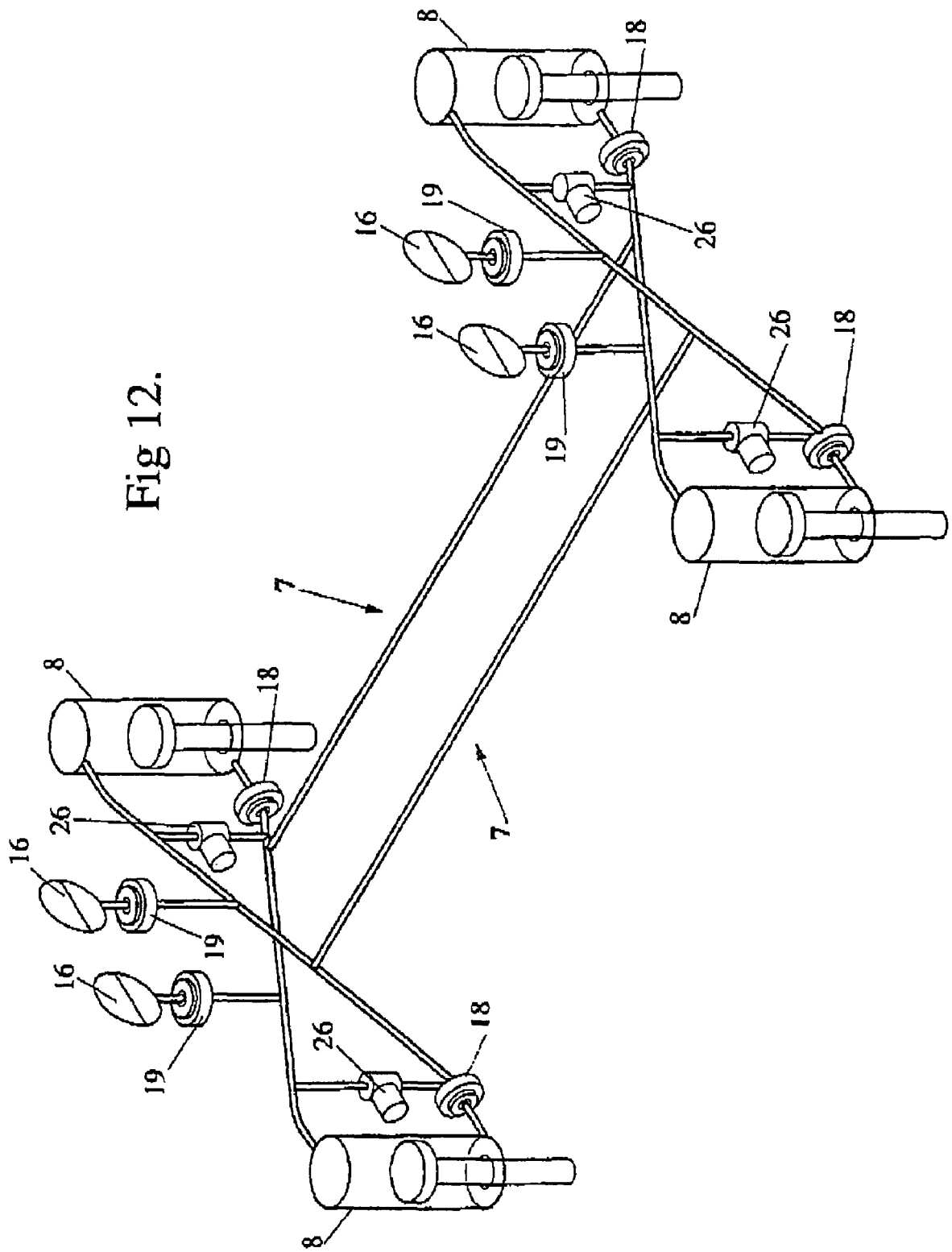

PASSIVE RIDE CONTROL FOR A VEHICLE SUSPENSION SYSTEM

CROSS-REFERENCE TO RELATED APPLICATIONS

The present invention is generally directed to vehicle suspension systems, and in particular to vehicle suspension systems incorporating improved passive ride control.

BACKGROUND

The desire for improved ride control in motor vehicles has: lead to the development of "active" vehicle suspension systems. Such systems typically use sensors to sense the various ride characteristics of the vehicle, the sensors providing signals to an Electronic Control Unit (ECU). The sensors sense any excessive roll, pitch, four wheel bounce and warp motions of the vehicle and its wheels, and the ECU seeks to actively compensate for this motion by controlling the supply of high pressure fluid from a fluid pump to different actuators acting within the vehicle suspension system, or by controlling the return of high pressure fluid from the actuators to a fluid reservoir. (The warp mode of a suspension system, also known as cross axle articulation, is defined as when one pair of diagonally spaced wheels together move in the opposite vertical direction to the other pair of diagonally spaced wheels with respect to the vehicle body). Active suspension systems which attempt to control all the above-noted ride characteristics are very expensive and complicated and have therefore not proven to be commercially viable. Simpler active systems which only seek to actively control excessive roll motions of the vehicle have therefore also been developed. Similarly, adaptive damping systems are becoming popular as they can be used to influence vehicle motions such as roll, pitch and whole body bounce by changing the damping rates at each wheel without the need for a pump.

All the known active suspension systems however have a number of problems which have prevented commercial acceptance of such systems except in luxury vehicles. The number of components required for such systems have lead to packaging difficulties, with the limited space available for such systems under existing motor vehicles. The complexity of active suspension systems and the high stresses applied to certain components of the system lead to ongoing reliability issues. Furthermore, active systems typically require a large number of components, some of which are specially produced components that can handle high mechanical stresses leading to high manufacturing costs. Also, expensive high pressure and high speed components are typically used in such systems, resulting in relatively higher manufacturing and running costs for active systems when compared with conventional suspension systems. Another disadvantage of active systems is the poor response times generally associated with production feasible versions of such systems. Valves are generally used to control the fluid flow in the system. There is always a certain delay before a valve can be actuated to allow or prevent fluid flow. This delay, together with other delays caused by inadequately defined algorithms controlling the system, can lead to unacceptably poor response times for the active suspension system. Active roll control systems typically respond too slowly when undergoing a quick slalom test for example, the control system being unable to provide adequate control under large changes of inertia.

The Applicant has developed a number of different vehicle system systems which seek to avoid at least some of the problems associated with active suspension systems while providing substantial improvements in the ride of a vehicle. These systems are "passive" and do not require sensors, ECUs or fluid pumps to operate. Such systems are described in Australian Patents 670034, 694762, 671592 and 699388 and International Application No. PCT/AU97/00870, details of which are incorporated herein by reference. These systems do however generally rely on components adapted to handle high pressure fluid.

Adaptive damping systems have been developed specifically to improve the damping function of a vehicle suspension system. These damping systems only require relatively low pressure components when compared with those required in the previously described systems, but provide substantially no roll stiffness. They generally have electrically variable or switchable orifices and preloads which are controlled to provide more appropriate damper forces in a range of predefined conditions to avoid the compromises of a single setting to suit all conditions.

In U.S. Pat. Nos. 5,486,018 and 5,584,498 (Yamaha), there are described interconnected damper systems where the top chamber of at least one pair of laterally or longitudinally adjacent dampers, commonly known as Oshock absorbers' are connected by a conduit. A number of arrangements are disclosed, providing a range of damping effects. However, none of the arrangements are designed to provide a roll stiffness for the suspension.

In U.S. Pat. No. 4,606,551 (Alfa), there is described an arrangement having dampers, each having an upper and lower chamber. At least one pair of laterally or longitudinally adjacent dampers are connected by conduits respectively connecting the upper chamber of one damper with the lower chamber of the other chamber. A number of damper valves are provided in the connecting conduits to provide various damping effects. No electronic control is required, nor can the arrangement provide a roll stiffness for the suspension.

Although each of the above described adaptive and interconnected damping systems provide an improved damping function over conventional damper arrangements, they do not provide any or only provide minimal control of other ride characteristics of the vehicle. For example, none of the above adaptive or interconnected damping systems provide roll support for the vehicle as they do not have any roll stiffness to enable a degree of roll control for the vehicle, only roll damping. These systems can therefore not be used to provide roll control for the vehicle.

SUMMARY

It is therefore an object of the present invention to provide a damping and roll control system which achieves improved ride control for the vehicle while avoiding at least one of the problems associated with prior art systems.

With this in mind, the present invention provides a damping and roll control system for a vehicle suspension system, the vehicle having at least one pair of laterally spaced front wheel assemblies and at least one pair of laterally spaced rear wheel assemblies, each wheel assembly including a wheel and a wheel mounting locating the wheel to permit movement of the wheel in a generally vertical direction relative to a body of the vehicle, and vehicle support means for providing at least substantially a major portion of the support for the vehicle; the roll control system including:

wheel cylinders respectively locatable between each wheel mounting and the body of the vehicle, each wheel cylinder including an inner volume separated into first and second chambers by a piston supported within the wheel cylinder; first and second fluid circuits respectively providing fluid communication between the wheel cylinders by fluid conduits, each said fluid circuit providing fluid communication between the first chambers of the wheel cylinders on one side of the vehicle and the second chambers of the wheel cylinders on the opposite side of the vehicle to thereby provide roll support decoupled from the warp mode of the vehicle suspension system by providing a roll stiffness about a level roll attitude whilst simultaneously providing substantially zero warp stiffness;

each fluid circuit including one or more fluid accumulators for providing roll resilience;

damper means for controlling the rate of fluid flow out of or into at least one chamber of each wheel cylinder; and selection means for selectively providing fluid communication between the first and second fluid circuit;

the damping and roll control system thereby providing substantially all of the damping of the vehicle suspension system.

The vehicle support means may in certain embodiments of the present invention provide at least substantially all of the support for the vehicle.

The damping and roll control system therefore provides damping for the vehicle suspension and provides a roll stiffness without introducing a corresponding warp stiffness.

Each fluid circuit may in one preferred embodiment include a first fluid conduit providing fluid communication between the first chambers of the wheel cylinders on one side of the vehicle; and a second fluid conduit providing fluid communication between the second chambers of the wheel cylinders on the opposite side of the vehicle; the first and second fluid conduits being in fluid communication.

According to another preferred embodiment, each fluid circuit may include first and second diagonal fluid conduits, each respectively providing fluid communication between the first chamber of one wheel cylinder on one side of the vehicle and the second chamber of the diagonally opposite wheel cylinder on the other side of the vehicle; the first diagonal fluid conduit between one pair of diagonally opposite wheel cylinders being in fluid communication with the second diagonal fluid conduit between the other pair of diagonally opposite wheel cylinders.

According to yet another preferred embodiment, each fluid circuit may include a front fluid conduit providing fluid communication between the wheel cylinders of the front wheel assemblies, and a rear fluid conduit providing fluid communication between the wheel cylinders of the rear wheel assemblies, with the front and rear conduits respectively providing fluid communication between the first chamber of the wheel cylinder at one side of the vehicle with the second chamber of the wheel cylinder at the opposite side of the vehicle, the front and rear conduits being in fluid communication.

It is to be appreciated that other connection arrangements are also envisaged. It is also to be appreciated that the same principles may be applied to vehicles with more than four wheels. For example, to apply the system to a six wheeled vehicle, the additional left hand wheel cylinder will have its first chamber connected to the conduit connecting the first chambers of the other two left hand wheel cylinders, and its second chamber connected to the conduit connecting the second chambers of the other two left hand wheel cylinders. The connection of the other cylinder to the right hand side of the vehicle similarly communicates first chambers together and second chambers together.

The damper means may be located at or in the wheel cylinders, in the conduits, and/or in a manifold block. The manifold block may be centrally located in the vehicle and may provide the required fluid communication between the first and second conduits to form the first and second fluid circuits. The damper means may be a bidirectional valve (i.e. provide controlled flow restriction in both directions), in which case each wheel cylinder requires only one damper valve for one of the first or second chambers. In this case, the associated chamber may try to suck a vacuum if the damper valve is not supplying fluid at the same rate at it is being demanded. This can lead to aeration of the fluid and potential loss of ride control by the system. To avoid this effect, a single direction damper valve may be used to ensure that the wheel cylinder chambers only act through a damper valve when expelling fluid, thereby preventing fluid aeration in the cylinder chambers. Alternatively, the single direction damper valve may be used in parallel with a non-return valve. Alternatively, to provide large damping forces with reliable, compact damper vase means, a bidirectional damper means may be provided for each of the first and second chambers of at least one pair of laterally spaced wheel cylinders.

Each said fluid circuit includes at least a first fluid accumulator to allow for changes in the fluid volume of each circuit to thereby provide roll resilience. Also, if a wheel cylinder with differing effective piston areas between the first and second chambers is used (for example a piston having a rod extending from one side only, as in a conventional damper cylinder assembly), the accumulator needs to be able to accommodate the rod volume changes within the system during bounce motions of the suspension. In this case, in roll, the accumulator absorbs a much greater change of fluid volume per unit displacement of the wheel cylinders than it absorbs in bounce as both the effective areas of a first chamber side and a second chamber side are working to displace fluid into the accumulator giving a correspondingly higher stiffness for roll motions of the roll control system than for bounce motions.

Each fluid circuit may include at least one second fluid accumulator to provide increased roll resilience. Between each second accumulator and the respective fluid circuit there may be a roll resilience switching valve. When the vehicle is travelling in a straight line, the valve may be held open to allow the second accumulators to communicate with the associated fluid circuits to provide additional roll resilience, thereby further improving ride comfort. When turning of the vehicle is detected, the roll resilience switching valve is closed to provide a desirable increase in roll stiffness during cornering. The detection of vehicle cornering may be performed in any known manner, using inputs for conditions such as steering rate of change, steering angle, lateral acceleration and vehicle speed. Any or all of these sensors and/or others not cited may be used.

The accumulators may be of the gas or mechanically sprung piston type or the diaphragm type and either or both can be beneficial in increasing the time to maintenance of the system by replenishing fluid lost from the system through leaks past rod seals and out of fittings. Any fluid loss should be minimal, therefore the effect on the operating pressure of the system may be negligible.

At least one of the accumulators in each fluid circuit may have a damper means to control the rate of fluid flow into and/or out of the accumulator. Due to the higher rate of fluid flow into and out of the accumulators in roll when compared to bounce (as discussed earlier), the effect of the accumulator dampers is greater in roll than in bounce giving a desirable high roll damping to bounce damping ratio. If the accumulators are not damped, the roll damping is determined by the bounce damping, as is the case when using conventional dampers.

Damping the accumulators can also have a detrimental effect to single wheel input harshness as single wheel inputs are also heavily damped by accumulator dampers. To increase comfort in straight line running, it can therefore be advantageous to provide a bypass passage around the accumulator damper valve to permit fluid to bypass the damper for at least one accumulator. The bypass passage includes a valve to open or close the passage. During turning, the valve is in the closed position and the accumulator damper valves are providing high roll damping. In straight line running, the valve is open to reduce the roll and single wheel input damping forces in the system. The roll control system may have a pressure precharge to allow the accumulators to function and supply fluid in rebound motions of the wheels (where they fall away from the vehicle body). This precharge is preferably about 20 bar for the roll control system with the vehicle at standard unladen ride height.

It may be preferable to use a wheel cylinder design with a rod protruding from one side of the piston through only one chamber. This allows for a simple and cheap cylinder design, but any system precharge pressure acting over the unequal effective piston areas in the first and second chambers produces a net cylinder force. This force may provide some support of the vehicle body although the proportion of vehicle load supported by the roll control system is usually very small and is similar to the degree of support provided by a conventional precharged damper cylinder assembly. The exact amount is determined by the cylinder rod and bore dimensions, system precharge pressure and cylinder to wheel hub lever ratio.

For example, in the case where the first chamber of each wheel cylinder is in compression as the wheels move upwardly with respect to the vehicle body, and the effective area of the piston on the first chamber side is larger than the effective area of said piston on the second chamber side, thereby providing a degree of support of the vehicle body.

If accumulators with a non-linear spring function (ie. a hydropneumatic accumulator which has an increasing stiffness in compression and a decreasing stiffness in rebound) are used and the roll control system provides a degree of vehicle support (as outlined above), then as the vehicle rolls due to lateral acceleration, the total volume of fluid in the accumulators can decrease overall, increasing the fluid volume in the roll control system and causing an overall increase in vehicle height (known as "roll jacking"). The degree of vehicle support provided by the roll control system influences the degree of roll jacking.

It may be desirable to produce the inverse of the roll jacking effect such that the average height of the vehicle is lowered during cornering. This effect can be produced in the case where the first chamber of each wheel cylinder is in compression as the wheels move upwardly with respect to the vehicle body, and the effective area of the piston on the second chamber side is larger than the effective area of said piston on the first chamber side, thereby providing a degree of additional load on the vehicle support means, tending to push the vehicle down towards the ground.

Preferably, a simpler arrangement may be used with the cheaper cylinder design which provides vehicle support (discussed above). The resilient means in the first accumulator may include one or more mechanical springs such that the spring rate in the compression direction from the normal static position is lower than the spring rate in the rebound direction from the normal static position, to thereby give the reverse effect of a conventional hydropneumatic accumulator and lower the average height of the vehicle during cornering. Additionally or alternatively, the rebound damping rate of the accumulators may be higher than the compression damping rate to provide a similar vehicle lowering effect and better response to steering Inputs during initial cornering (turn-in). Indeed, only rebound damping may be provided for the accumulators, with a non-return valve allowing virtually unrestricted flow in the compression direction.

Ideally, the roll control system should not provide any vertical support of the vehicle. Therefore, in another, alternative preferred arrangement of the present invention, the effective piston areas in the first and second chambers of each cylinder may be similar, the roll control system thereby supporting substantially zero vehicle load. As the amount of vehicle load support provided by the roll control system is one of the main factors controlling the amount of roll lacking inherent in the system, using wheel cylinders with similar effective piston areas in the first and second chambers and which therefore do not provide any vehicle support provides the roll control system with zero roll jacking.

However, in some applications, the use of a cylinder having piston rods extending from both ends thereof can lead to packaging difficulties because of the need to provide clearance for the upwardly extending piston rod. Therefore, according to another preferred arrangement, a piston rod may extend from one side of the piston, the piston rod having as small a diameter as physically possible to minimise the vehicle support provided by the damping and roll control system. In another possible arrangement, a hollow piston rod may extend from one side of the piston, and an inner rod may be supported within the inner volume of the cylinder, the inner rod being at least partially accommodated within the hollow piston rod, the hollow piston rod moving together with the piston relative to the inner rod. This arrangement may be used to minimise the difference in area of the opposing piston faces to minimise the vehicle support provided by the damping and roll control system.

According to an alternative preferred embodiment, the hollow piston rod arrangement of the wheel cylinder may be adapted to also provide a vertical support function for the vehicle. The piston supported in the wheel cylinder may provide an upper and lower chamber. The inner rod when supported within the hollow piston rod defines a rod chamber. This rod chamber may be used as part of a fluid circuit of the roll control system. To this end, the area of the peripheral end of the inner rod may be at least substantially identical to the area of the piston facing the lower chamber. Alternatively, it can be preferable to use a larger lower chamber area than the rod chamber area to induce lowering of the vehicle in roll with increasing roll moment when hydropneumatic accumulators are used in the system.

The upper chamber may be sealed to provide a bounce chamber to provide resilient support for the vehicle. The rod chamber may be vented and, together with the lower chamber, form a respective part of a fluid circuit of the roll control chamber.

It should be noted that the roll moment distribution for the roll control system is determined by the ratio between the effective piston areas of the front wheel cylinders compared to the effective piston areas of the rear wheel cylinders. Ideally, in most applications, each wheel cylinder should have a constant ratio between the effective piston area on the first chamber side compared to the second chamber side.

One advantage of using cylinders where the piston rod is only provided extending from the one piston face is that the degree of support provided by the cylinders can be varied by varying the support height of the vehicle. As the vehicle is lowered the support provided by the roll control system increases leading to higher roll stiffness. This is an affect of having an increased volume of piston rod introduced into the roll control system.

The support means for at least one pair of laterally spaced wheel assemblies may include first support means which are independent for each wheel assembly, thereby contributing an additional roll stiffness to the suspension system. Both the vehicle support means and the roll control system can together provide the roll stiffness for the vehicle in this arrangement.

Additionally or alternatively, the support means for at least one pair of laterally spaced wheels may include second support means which are interconnected between each wheel thereby contributing substantially zero roll stiffness to the suspension system. This and other vehicle support arrangements that provide little to no roll support and combinations of support arrangements are described in the Applicants' International Application No. PCT/AU97/00870 referred to previously. In such an arrangement, the damping and roll control system can provide substantially all of the roll control for the vehicle, Furthermore, if the support means have substantially zero roll stiffness, the damping and roll control system can provide substantially all of the roll control for the vehicle. In this case, neither the support means or roll control system provides significant warp stiffness. This allows for substantially free warp motion of the vehicle wheel assemblies, improving comfort, reactions to single wheel inputs and providing substantially constant wheel loads (and therefore improved traction) in low speed or non-dynamic warp motions when traversing uneven terrain such as in off-road situations.

According to the present invention, the first and second fluid circuits may be in fluid communication such that fluid may be transferred therebetween. To this end, at least one bridge passage may interconnect the first and second fluid circuits to provide for said fluid communication. The bridge passage may be provided by a bridge conduit. Alternatively, the bridge passage may be provided within a connector body to which the conduits of the first and second circuits are connected. At least one flow control valve may be provided for controlling the flow through the bridge passage.

One or more accumulators may optionally also be provided for the bridge passage. The flow control valve and accumulator may be provided on a said bridge conduit. According to another possible arrangement, the control valve and/or accumulator may be supported on the connector body. It is also possible for all the damper valves and accumulators previously referred to be located on a common said connector body to simplify the packaging of the system within a vehicle.

The flow control valve may be opened, for example when there is little demand on the roll control system when the vehicle is travelling on a straight road. When the flow control valve is opened, this leads to a "short-circuiting" of the system such that the first and second chambers of each cylinder are allowed to communicate directly. This controlled interconnection of the first and second fluid circuits by the controlled opening of the flow control valve provide a number of operational advantages that lead to improved comfort for the passengers of the vehicle:

a) The damping and roll control system provides no roll stiffness, the only roll stiffness being provided by the vehicle support means.
b) The damping and roll control system no longer effects the roll split of the vehicle, the roll split only being provided by the vehicle support means. If the roll split provided by the vehicle support means is between approximately 40 and 60%, this (in combination with the low roll stiffness) acts to reduce vehicle motions leading to ahead toss.
c) As there is little resistance to the fluid flow between the chambers of each cylinder except for that provided by the wheel damper valve, the single wheel stiffness is reduced.
d) Because the accumulator damper valves are bypassed, they do not influence the damping function of the damping and roll control system, and the roll damping is the same as the bounce damping.
e) The single wheel damping is (for the same reason) the same as the bounce damping.
f) The bounce damping however remains unchanged when the flow control valve is opened.

The operation of the flow control valve may be controlled by an Electronic Control Unit on the basis of operational parameters such as the lateral acceleration, speed and steering rate of the vehicle.

It is also possible for a plurality of bridge passages to be provided interconnecting the first and second fluid circuits. Each bridge passage may be provided with a said flow control valve.

It is also possible that the wheel cylinder include an integral flow control valve and/or damper valve therein. The piston of the wheel cylinder may include a flow control valve and/or damper valve controlling the flow of fluid between the first and second chambers.

The use of a plurality of bridge passages having flow control valves or wheel cylinders having built-in flow control valves facilitates fluid flow between the first and second chambers of the wheel cylinders. This can lead to a reduction in the inertia forces due to fluid flow through the system resulting in improved isolation of high frequency inputs and sharp edge inputs to the vehicle wheels. The effect of inertia forces within the roll control system will be subsequently described in more detail.

As the damping and roll control system can be switched to provide substantially zero roll stiffness, the use of zero roll stiffness support means for all wheels is not viable. However, zero roll stiffness support means may still be used in combination with independent support means providing some roll stiffness. Therefore, the support means for at least one pair of laterally spaced wheels may include first support means for supporting at (east a portion of the load on the associated wheel assemblies, said first support means providing independent resilience for each respective wheel and thereby providing a roll stiffness.

Additionally, the support means for at least one pair of laterally spaced wheels may include second support means for supporting at least a portion of the load on the associated wheel assemblies, said second support means providing combined resilience for each associated wheel assembly and thereby providing substantially zero roll stiffness.

It is to be appreciated that the conduit size may be selected to provide a degree of the damping required by the damping and roll control system. Depending on the level of ride comfort required in an application, the conduit size may be selected based on a variety of factors such as fluid inertia, fluid friction due to viscosity through range of operating temperatures, etc.

The vehicle support means preferably provides most if not all the vertical support for the vehicle. The damping and roll control system however preferably provides little to no vertical support for the vehicle such that the operating fluid pressure within the damping and roll control system can therefore be relatively low when compared with active roll control systems and the Applicants' earlier suspension systems. Theoretically, if the roll control system provides no vertical support for the vehicle, the operating pressure may be only atmospheric pressure, ie. the system has no pre-charge pressure.

The damping and roll control system of the suspension system according to the present invention can therefore use low pressure components. The wheel cylinders can be constructed using standard vehicle damper and sealing technology. This leads to substantial manufacturing cost savings when compared to higher pressure systems. Also, comfort and NVH problems associated with higher pressure systems such as "stiction" between components are minimised in low pressure systems, the stiction levels being similar to that present in a conventional damper cylinder assembly.

Such a damping and roll control system can be installed in existing vehicle suspension systems, the dampers used in such systems being replaced or adapted for use as the wheel cylinders of the roll control system according to the present invention. The existing vehicle support means supporting the vehicle such as conventional steel or pneumatic springs can be retained. Alternatively, the vehicle support means may be replaced by support means that provide little to no roll support as described previously. This is possible because the damping and roll control system also provides a roll stiffness for the vehicle suspension system.

According to a further aspect of the present invention, there is provided a method of controlling the roll damping and roll stiffness of a damping and roll control system for a vehicle suspension system, the damping and roll control system including:

wheel cylinders respectively locatable at wheel assemblies of the vehicle, each wheel cylinder including an inner volume separated into first and second chambers by a piston supported within the wheel cylinder; and first and second fluid circuits respectively providing fluid communication between the wheel cylinders by fluid conduits, each said fluid circuit providing fluid communication between the first chambers of the wheel cylinders on one side of the vehicle and the second chambers of the wheel cylinders on the opposite side of the vehicle to thereby provide roll support decoupled from the warp mode of the vehicle suspension system by providing a roll stiffness about a level roll attitude whilst simultaneously providing substantially zero warp stiffness;

damper means for controlling the rate of fluid flow into and out of at least one chamber of each wheel cylinder;

the method including opening the selection means to provide fluid communication between the first and second fluid circuits when the damping and oil system is required to provide a relatively low level of roll stiffness and roll damping; and closing the selection means to prevent fluid communication between the first and second fluid circuits when the damping and roll system is required to provide a relatively high level of roll stiffness and roll damping.

The fluid flow may be bypassed from at least a substantial portion of the fluid conduits by opening the selection means when there is a single wheel input or two wheel parallel bump input to the damping and roll control system. The line damping and fluid inertia effects on the damping of the control system can therefore be minimised at such wheel inputs.

It is also envisaged that the entire fluid flow be bypassed from the fluid conduits at the predetermined wheel inputs. This can for example be achieved by providing a control valve within the wheel cylinder as hereinbefore described.

Damping means such as single and bi-directional damper valves may be provided through which the bypassed fluid flow passes, these damping means clearly controlling the damping of the control system during this operational mods.

It will be convenient to further describe the present invention with respect to the accompanying drawings which illustrate preferred embodiment of the invention. Other embodiments of the invention are possible, and consequently the particularity of the accompanying drawings is not to be understood as superseding the generality of the preceding description of the invention.

DRAWINGS

In the drawings:

FIGS. 6a to 6j are schematic views showing the fluid flow within the damping and roll control system according to the prevent invention under different wheel inputs to the vehicle;

FIG. 8b is a figure similar to FIG. 8a but without the bridge bypass 20 and the bridge valve 26;

FIG. 9 is a schematic view of a fifth possible arrangement of a roll control system according to the present invention;

FIG. 10a is a schematic view of a sixth possible arrangement of a roll control system according to the present invention;

FIGS. 10b and 10c is a schematic cross-sectional view of the wheel cylinder piston with an internal flow control valve and damper valve for the arrangement shown in FIG. 10a;

FIG. 11 is a schematic view of a seventh possible arrangement of a roll control system according to the present invention; and FIG. 12 is a schematic view of an eighth possible arrangement of a roll control system according to the present invention.

DESCRIPTION

Figure 1:
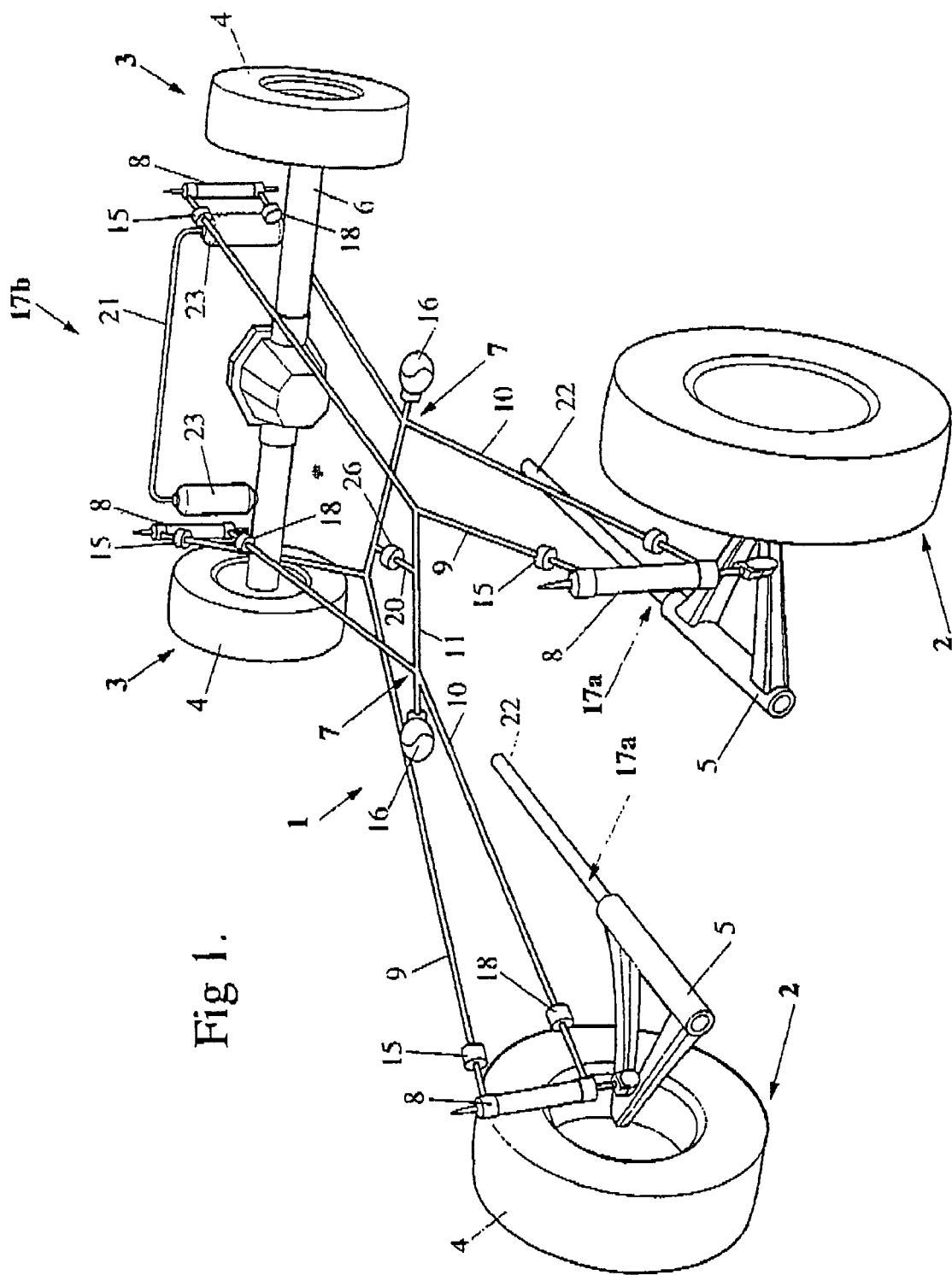
FIG. 1 is a partially schematic view of a first preferred embodiment of a roll control system according to the present invention mounted on wheel assemblies of a vehicle.

Referring in initially to FIG. 1, there is shown the front wheel assemblies 2 and rear wheel assemblies 3 of a vehicle, the body of the vehicle not being shown for clarity reasons. Each front wheel assembly 2 includes a wheel mounting 5 in the form of a wish-bone link contributing to the location of a respective wheel 4 (a second wishbone may be used but is omitted for clarity, other types of wheel locating links may be used). The rear wheel assemblies 3 have a common solid axle 6 to which each wheel 4 is mounted. The vehicle support means 17a, 17b for supporting the vehicle are shown fixed to the front wishbones 5 and adjacent the rear wheel axle 6 and include independent torsion bars 22 and a pair of air springs 23 interconnected by a conduit 21. The independent form of front vehicle support means 17a shown as torsion bars provide a roll stiffness and the interconnected form of rear vehicle support means provides practically no roll stiffness because fluid is allowed to flow between the air springs 23 via the conduit 21. Alternative vehicle support means can also be used, such as any known independent support means or low roll stiffness support means, or any combination different support means. For example, the vehicle may be supported entirely by independent coil springs. Alternatively, it may be supported by a combination of independent coil springs and interconnected air springs at one or both ends of the vehicle. Any combination of independent, combined or zero roll stiffness support means may be used on the front and rear of the vehicle. Many variations are shown and described in the Applicants International Application No. PCT/AU97/00870 and incorporated herein by reference.

A damping and roll control system 1 interconnects the front and rear wheel assemblies 2, 3 and includes a wheel cylinder 8 respectively provided for each front wheel assembly 2 and rear wheel assembly 3, and a pair of fluid circuits 7.

Figure 2:
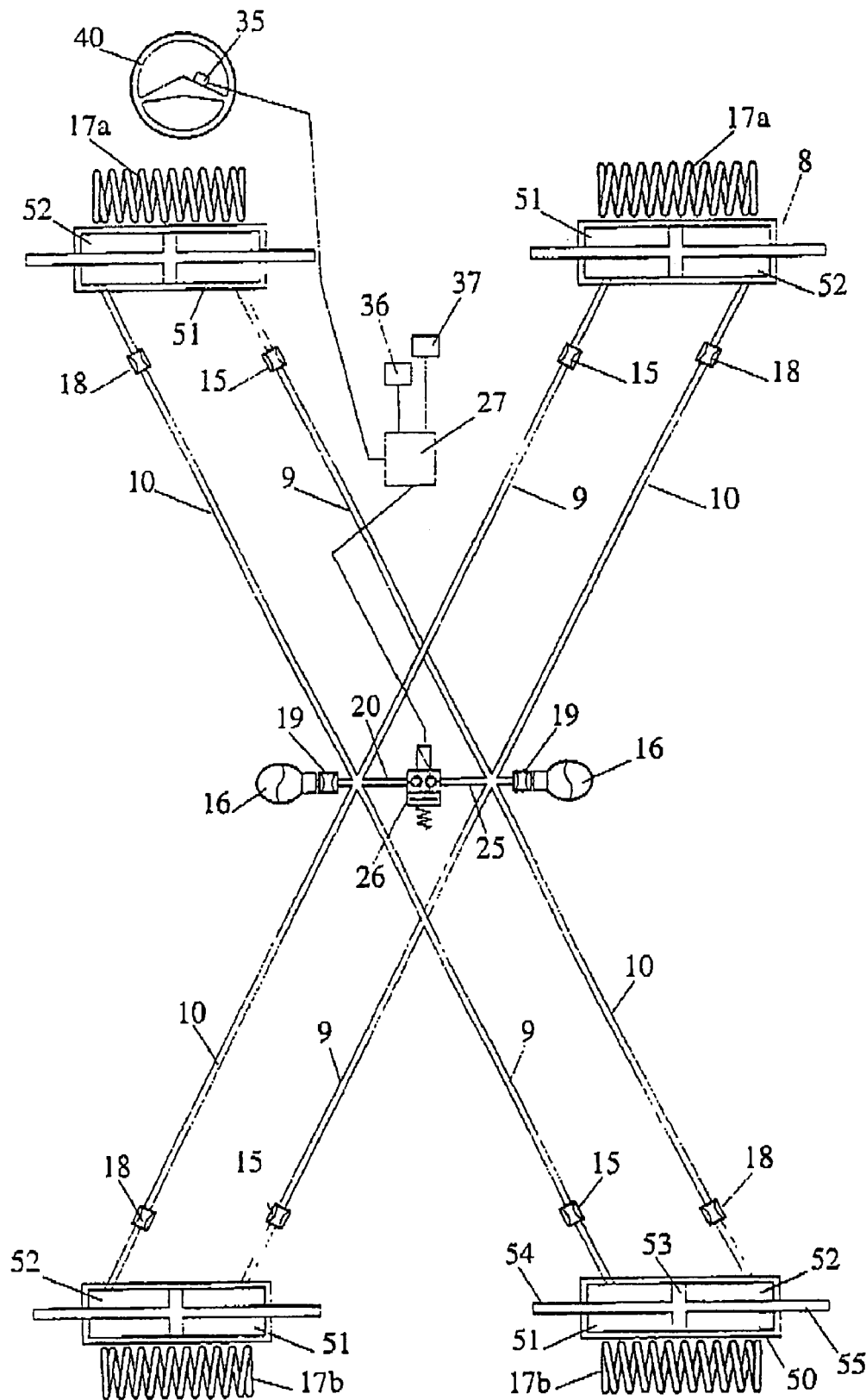
FIG. 2 is a schematic view of second preferred embodiment of a roll control system according to the present invention.

The configuration of the damping and roll control system 1 can be more readily understood by referring to FIG. 2. (Alternative possible arrangements of the damping and roll control system 1 are discussed later and shown in FIG. 5 onwards) of this arrangement and of subsequent arrangements. It should be noted that corresponding features are designated with the same reference numeral for clarity reasons. Each wheel cylinder 8 has an inner volume 50 separated into an upper chamber 51 and a lower chamber 52 by a piston 63. Piston rods 54, 55 extend from both sides of the piston 53 in the wheel cylinder 8 shown in FIGS. 2 and 3. Each fluid circuit 7 further includes an upper conduit 9 connecting the upper chambers 51 of one pair of longitudinally adjacent wheel cylinders 8, and a lower conduit 10 interconnecting the lower chambers 52 of the opposing pair of longitudinally adjacent wheel cylinders 8. As best shown in FIG. 1, each fluid circuit 7 may further include a cross conduit 11 which connects the lower conduit 10 with the upper conduit 9. The two cross conduits 11 are themselves connected by a bridge passage 20.

Wheel damper valves 18 can be provided on the lower conduit 10, a respective wheel damper valve 18 being provided for the lower chamber 52 of each wheel cylinder 8. Wheel damper valves 15 can also be provided on the upper conduit 9, a respective upper wheel damper valve 15 being provided for each upper chamber 51 of each wheel cylinder 8.

An accumulator 16 can also be provided for each fluid circuit 7. In the arrangement shown in FIGS. 1 and 2, each accumulator 16 is provided at the junction between the lower conduit 10 and cross conduit 11. An accumulator damper valve 19 is provided at the mouth of each accumulator 16.

A flow control valve 26 is provided on the bridge passage 20 for controlling the flow of fluid through the bridge passage 20. The flow control valve 26 is controlled by an electronic control unit (ECU) 27 which controls the valve 26 as a function of different operational parameters. FIG. 2 shows the ECU 27 receiving signals from a steering input sensor 35 located on a steering wheel 40 of the vehicle, a lateral acceleration sensor 36 and a speed sensor 37. As the wheal cylinders 8 shown in FIG. 2 include piston rods 54, 55 extending from both sides of the piston 53 such a wheel cylinder 8 provides no support for the vehicle. The support is therefore substantially entirely provided by the vehicle support means 17a, 17b which are schematically shown as toll springs in FIG. 2.

Figure 3:
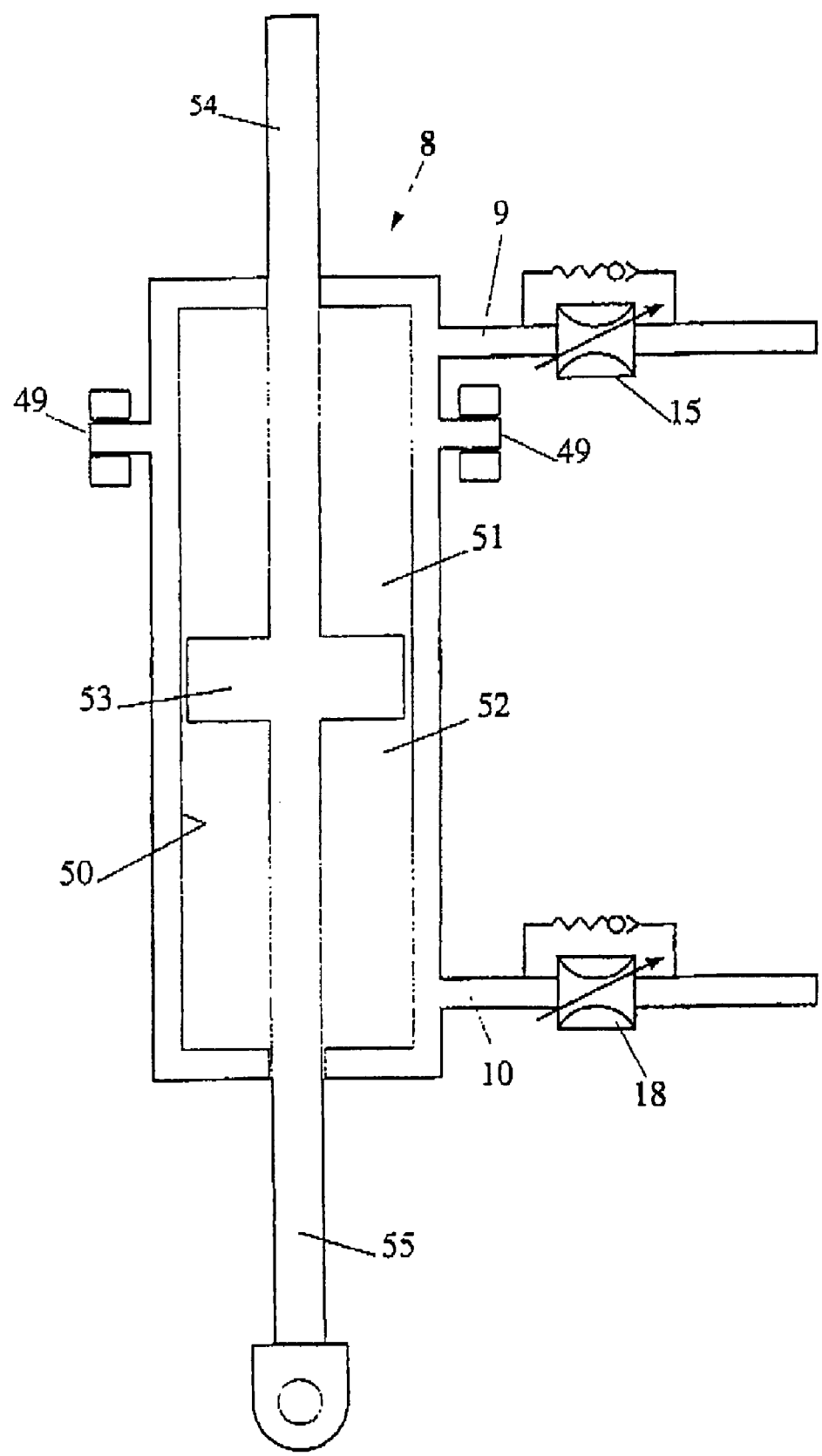
FIG. 3 is a detailed view of a preferred embodiment of a wheal cylinder and wheel damper valve arrangement according to the present invention.

FIG. 3 is a detailed view of the wheel cylinder 8 of FIG. 2 and its associated wheel damper valves 15, 18. The lower wheel damper valve 18, which is schematically shown in FIG. 3, provides a restriction of fluid flow to the lower chamber 52 while allowing relatively unimpeded flow of fluid from that lower chamber 52. By comparison, the upper damper valve 15, also shown schematically in FIG. 3, restricts the flow of fluid from the upper chamber 51 while at the same time providing relatively unimpeding flow of fluid to the upper chamber 51. This arrangement allows a positive pressure to be maintained in the upper and lower chambers 61, 52 and the upper and lower conduits 9, 10 to thereby prevent a vacuum being formed therein. This which can result in aeration of the fluid which can cause the damping and roll control system 1 to not operate properly. Part of a "gimbal" style mount for this "through rod" cylinder design is shown at 49.

Figure 4:
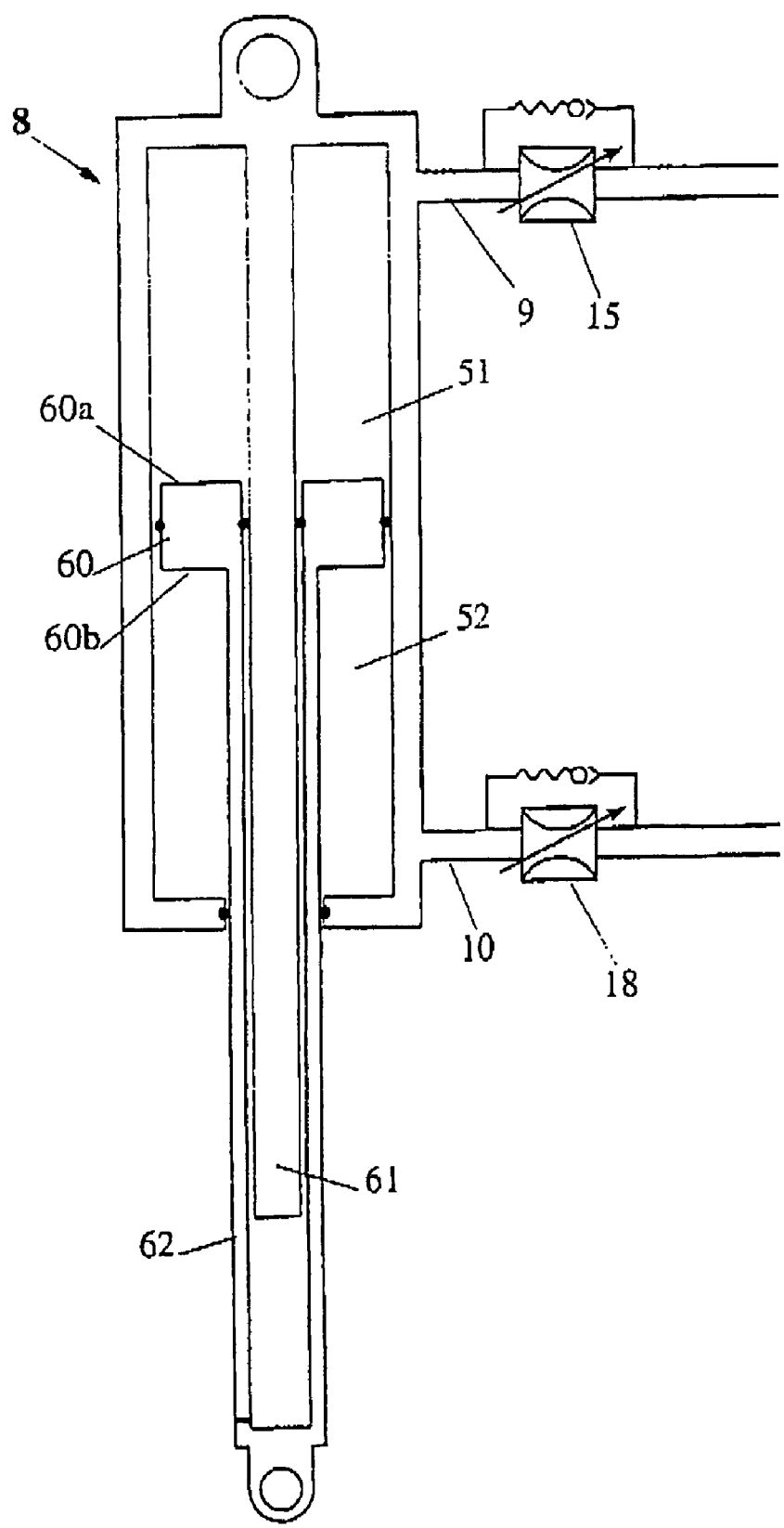
FIG. 4 is a schematic view of another preferred embodiment of a wheel cylinder and wheel damper valve according to the present invention.

FIG. 4 shows an alternative possible arrangement of the wheel cylinder 8 according to the present invention. This wheel cylinder 8 includes a "dummy" rod 61 extending internally through the inner volume 50 of the wheel cylinder 8. The dummy rod 61 is slidably accommodated within a hollow rod 62 which is itself supported on the piston 60. The piston 60 and hollow rod 62 which can therefore slide over the dummy rod 60. This arrangement minimises the difference in area between the upper face 60a and the lower face 60b of the piston 60. The wheel cylinder 8 according to this arrangement will therefore provide minimal support for the vehicle.

Figure 5:
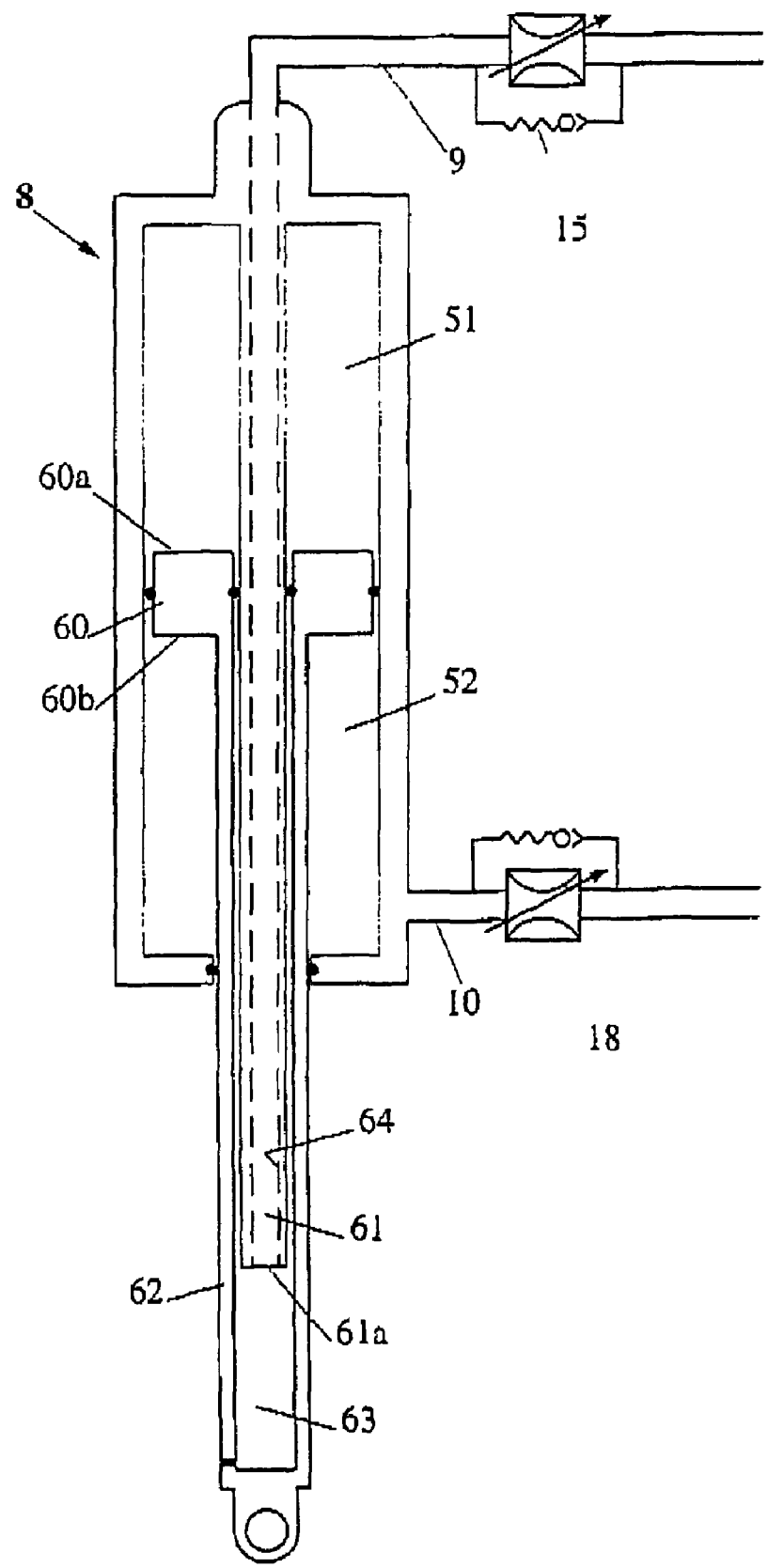
FIG. 5 is a schematic view of yet another preferred embodiment of a wheel cylinder according to the present invention.

The wheel cylinder shown in FIG. 4 could also be adapted to provide a support function for the vehicle as well as provide for roll control as shown in FIG. 5. The dummy rod 61 when located within the hollow rod 62 defines a rod chamber 63. The dummy rod 61 has an area 51a at its peripheral end. The diameter of the dummy rod 62, and therefore the end area 61a may be sized such the area of the lower face 60b of the piston is at least substantially the same as the end area 61a of the dummy rod. By sealing the upper chamber 51 and venting the rod chamber 63 along a vent passage 84 provided through the dummy rod 61 so that it becomes part of the roll control system, this allows the wheel cylinder to also function as a support for the vehicle. The sealed upper chamber 51 will in this configuration act as a bounce chamber to provide resilient support for the vehicle such that the need for other support means such as coil springs can be eliminated. The lower chamber 52 and rod chamber 63 can then respectively form part of the fluid circuit of the roll control system.

FIGS. 6a to 8j schematically shows the fluid flows through the damping and roll control system 1 during different wheel inputs and vehicle motions. The arrow designated with the letter D represents the magnitude and direction of the wheel input into the wheel cylinder 8 immediately adjacent the arrow. The remaining arrows represent the direction and magnitude of the fluid flows within the damping and roll control system. In all of the following Figures, the front of the vehicle is located at the top left hand corner of each Figure.

Single Wheel Input

Figure 6A:
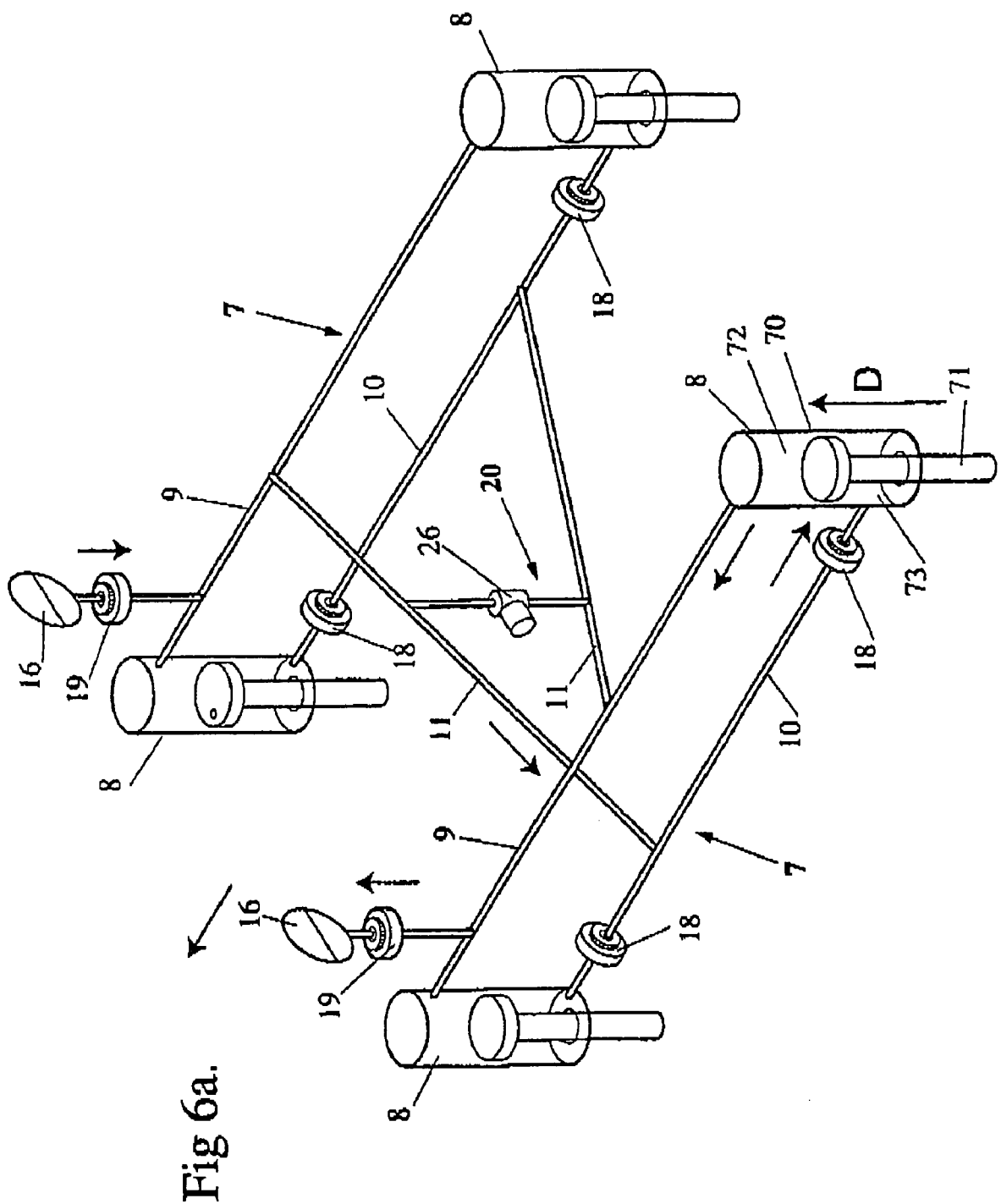
Figure 6B:
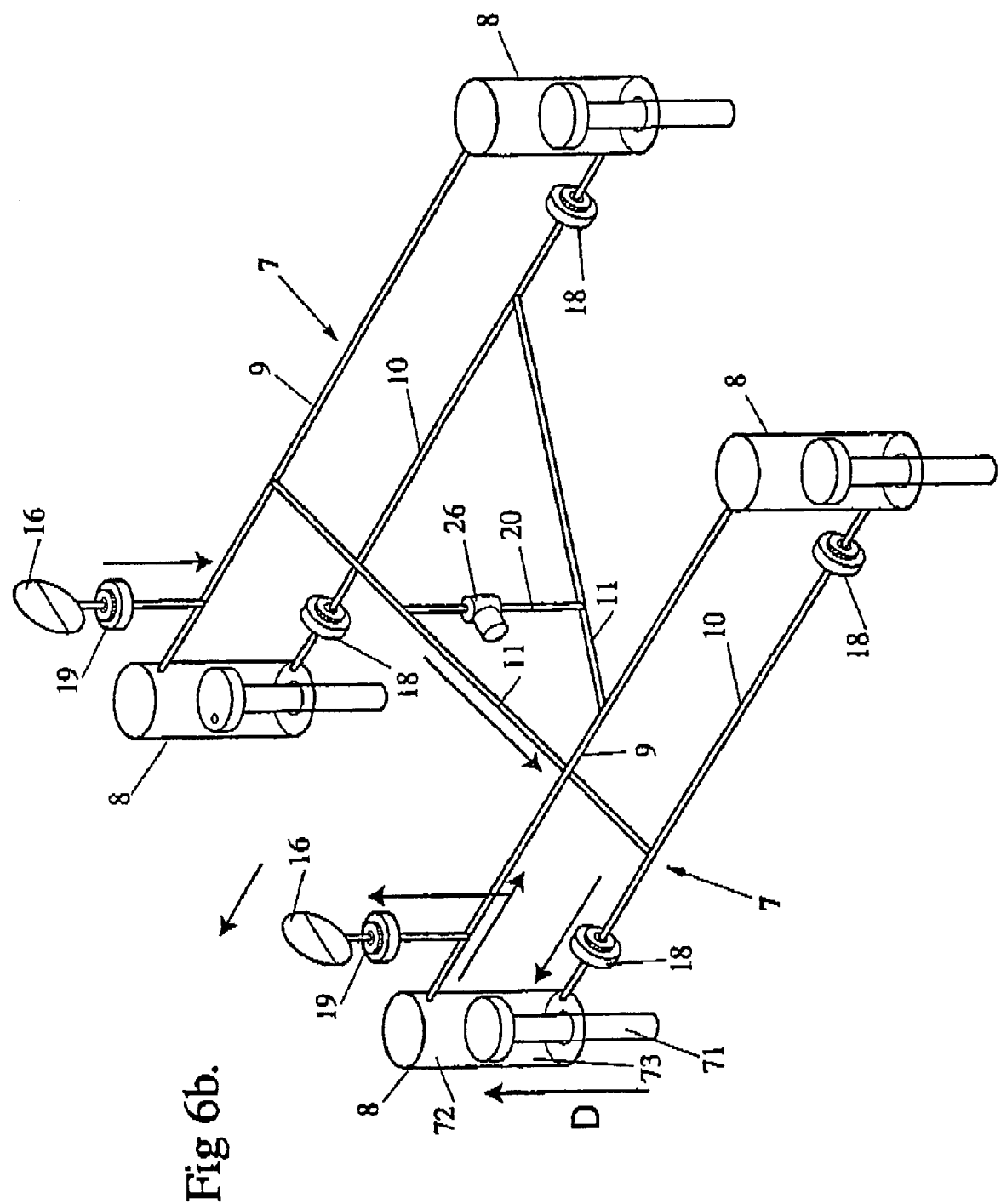

FIGS. 6a to 6C shows the fluid flows in response to a single wheel input. It should be noted that the wheel cylinders 8 are shown having a piston 70 with a single piston rod 71 extending from the bottom face of the piston 70. Such a wheel cylinder 8 provides a small degree of support for the vehicle due to the difference in the areas of the upper and lower piston faces of the piston 70. The degree of support provided by the wheel cylinder 8 can however be minimised by having the diameter of the piston rod 71 as narrow as physically possible.

FIGS. 6a and 6b show the fluid flow when the flow control valve 26 in the bridge passage 20 is closed. In FIG. 5a, a wheel input D is provided to the left rear wheel cylinder 8. This results in an upward movement of the piston 70 therein which reduces the volume of the upper chamber 72 of that wheel cylinder 8. Because the fluid is incompressible, some fluid is transferred along the upper conduit 9 to the accumulator 16. Because of the increase in volume in the lower chamber 52 of the rear left wheel cylinder 8, fluid must be drawn from another part of the damping and roll control system 1. To this end, fluid can be drawn from the accumulator 16 located on the top conduit 9 on the tight hand side of the vehicle, through the cross conduit 11 to the lower conduit 10 on the left hand side of the vehicle. No fluid is therefore drawn from of directed to the other wheel cylinders 8 and there is therefore no displacement of the piston rod 71 of the other wheel cylinders 8. It should be noted that the lower wheel damper valve 18 associated with the left rear wheel cylinder 8 and the accumulator damper valves 19 control damping of the vehicle motion.

FIG. 6b shows the effect of a single wheel input D into the left front wheel cylinder 8. In comparison with FIG. 6a, a greater magnitude of fluid flow occurs within the damping and roll control system 1, the fluid forced from the upper chamber 72 of the left front cylinder 8 being directed to the accumulator 16 on the left hand side of the vehicle, with further fluid being drawn from the accumulator 16 of the right hand side of the vehicle to the lower chamber 73 of the left front cylinder 8. There is again no displacement of the piston rod 71 of the remaining wheel cylinders 8. In this situation, the magnitude of flow to and from the accumulators are significantly higher than when the single wheel input is to one of the rear wheel cylinders 8. The damping of the vehicle motion is therefore largely controlled by the accumulators.

In FIG. 6c, the fluid flow valve 26 is open allowing flow through the bridge passage 20. This valve 26 is opened when the vehicle is not undergoing any motion that would place a demand on the damping and roll control system 1. The same wheel input D into the front left wheel cylinder 8 simply results in fluid being delivered from the upper chamber 72 thereof along the upper conduit 9, through the cross conduit 11, the bridge passage 20, the other cross conduit 11, the lower conduit 10, back to the lower chamber 73 of the left front wheel cylinder 8. The fluid. In other words flows from the upper chamber 72 to the lower chamber 73 of the wheel cylinder 8 with little to no fluid flow to and from the accumulator 16 on each fluid circuit 7. The damping is therefore entirely controlled by the lower wheel damper valve 18 associated with the left front wheel cylinder 8. The single wheel damping in this situation is therefore the same as the bounce damping of the system.

Two Wheel Bounce

Figure 6D:
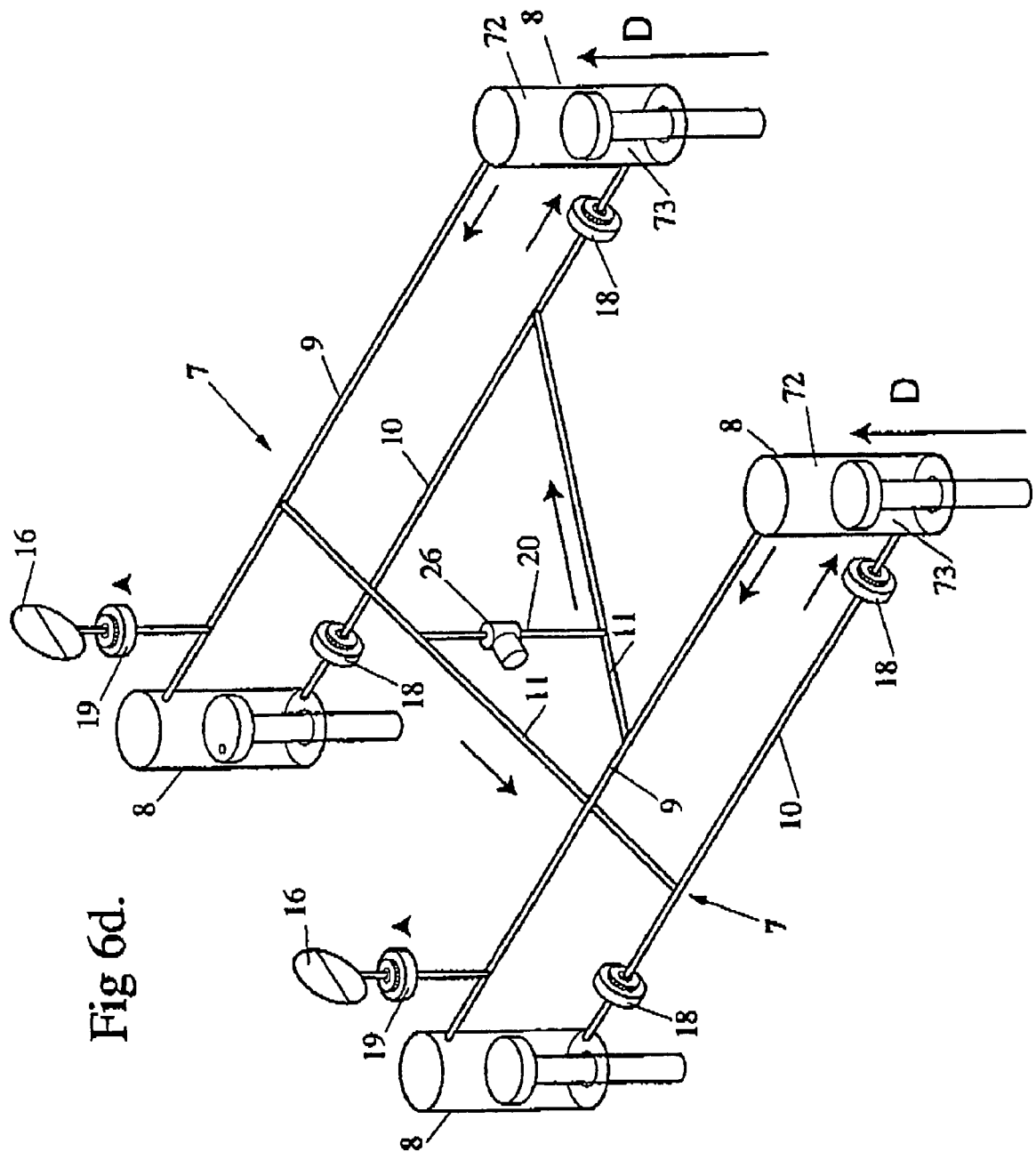

FIGS. 6d and 6e show the fluid flows in the damping and roll control system 1 when two wheel bounce is experienced. In both figures, the flow control valve 26 remains closed. FIG. 8d shows a wheel input D being applied to the two rear wheel cylinders 8. The reduction in the volume of the upper chamber 72 of each of the rear wheel cylinders 8 results in fluid being pushed through the top conduits 9 along the cross conduits 11 to the lower chambers 73 of the adjacent rear wheel cylinder 8. There is no fluid flow to or from the front wheel cylinders 8 or the accumulators 19 and the damping is controlled by the lower wheel damper valves 18 of each of the said cylinders 8.

In FIG. 6e, there is shown a wheel input D to the two font wheel cylinders 8. This results in a corresponding fluid flow of fluid from the upper chamber 72 of the front wheel cylinder 8 to the lower chamber 73 of the adjacent front wheel cylinder B. The damping is again controlled by the lower wheel damping valves 18, with little to no fluid flow to the accumulators 16.

Four Wheel Bounce

FIG. 6f shows the fluid flow in the right control system 1 when a wheel input D is provided to all four wheel cylinders 8, with the flow control valve 26 remaining closed. The fluid displaced from the upper chambers 72 of the wheel cylinders 8 on one side of the vehicle is displaced through the cross conduit 11 and the lower conduit 10 to the lower chambers 73 of the wheel cylinders 8 of the opposing side of the vehicle. There is little to no flow to and from the accumulators 16 and the damping is controlled by the lower wheel damper valves 18.

Roll

Figure 6G:
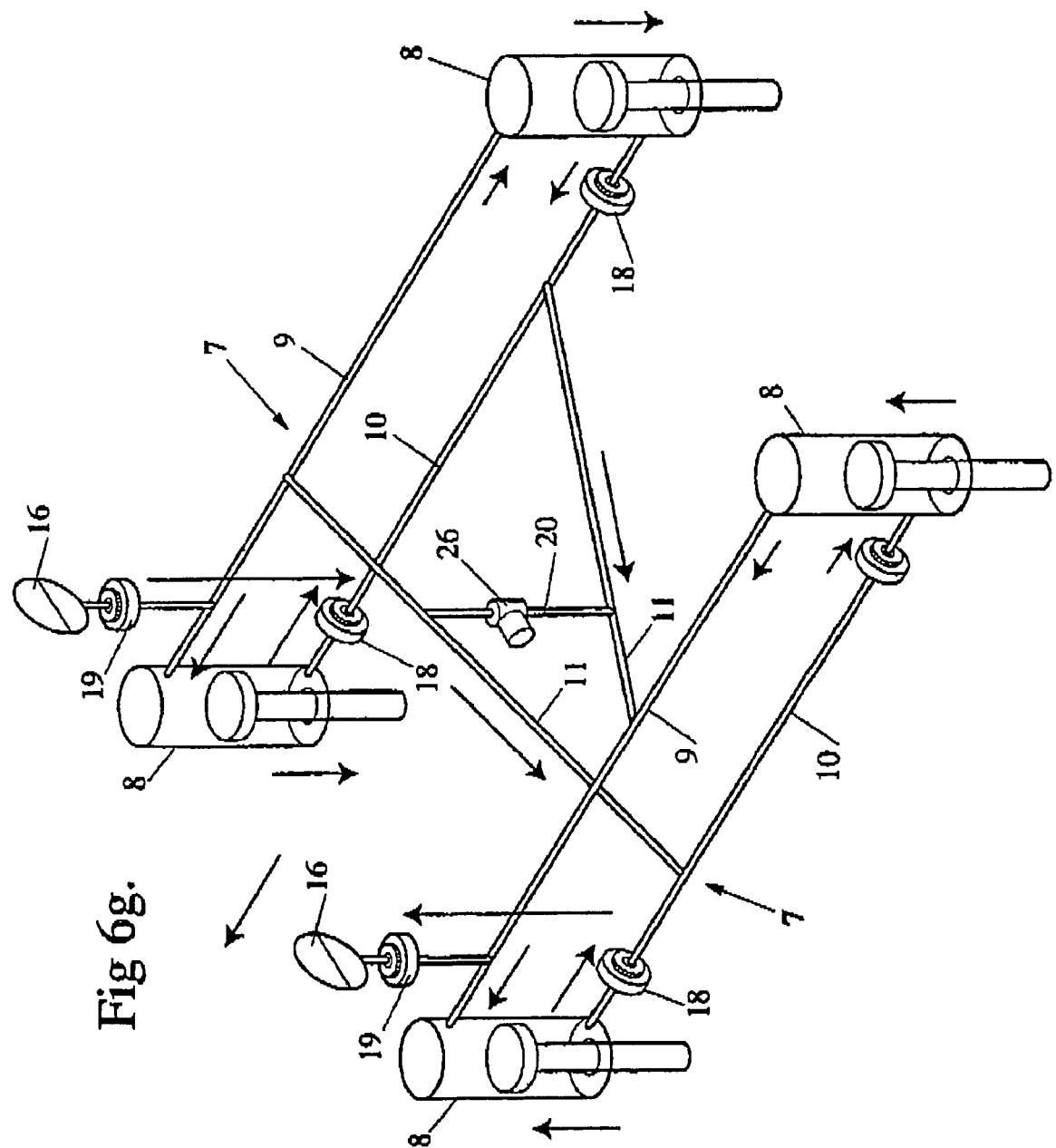
Figure 6H:
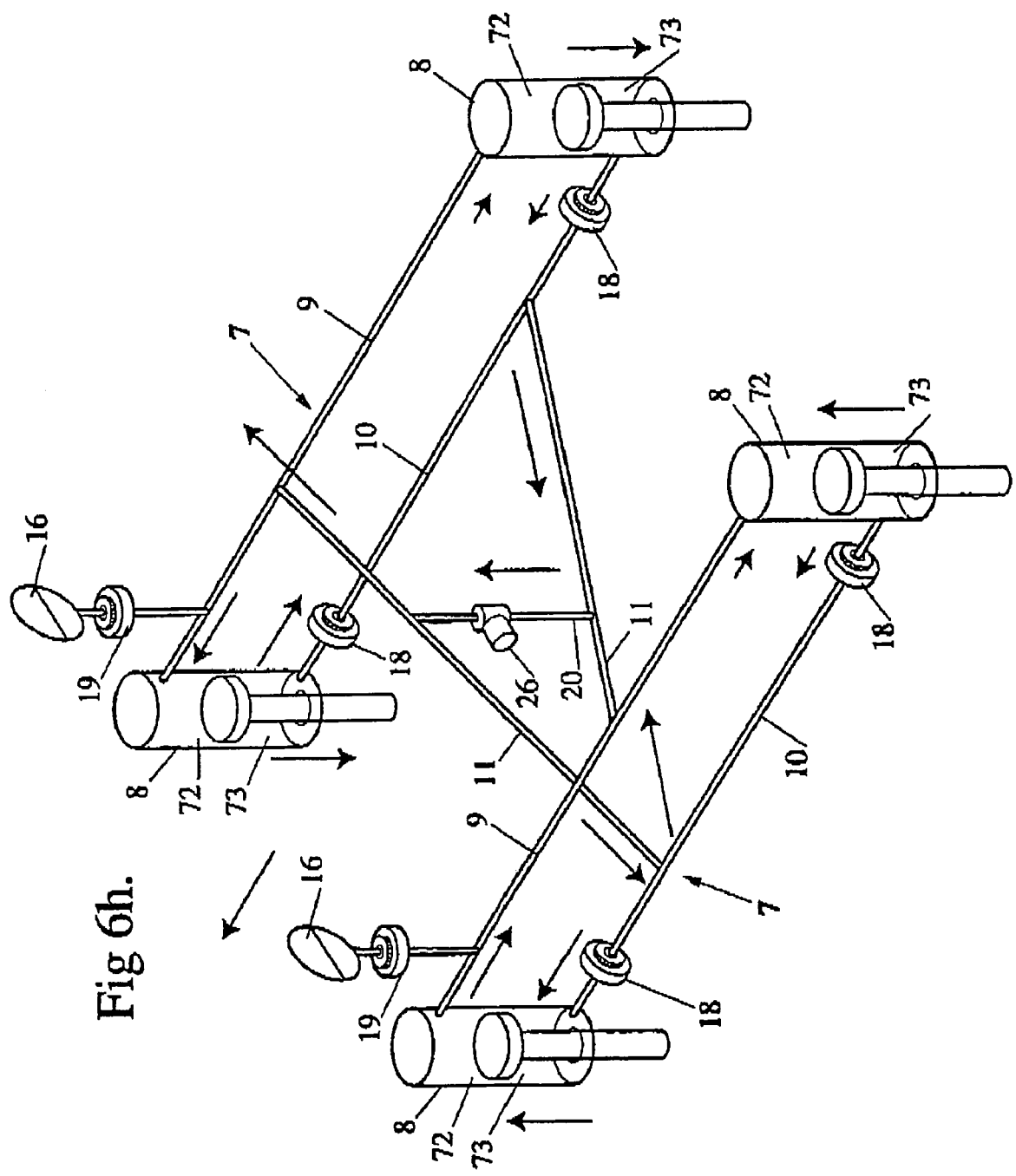

FIGS. 6g and 6h show the fluid flow control valve 26 is closed in FIG. 6g and is opened in FIG. 6h. The roll motion of the vehicle results in a wheel input D being provided to the wheel cylinders 8 on the left hand side of the vehicle in an upward direction, the wheel input to the wheel cylinders 8 of the right hand side of the vehicle being in a downward direction. The next result of the fluid flaw is that a substantial amount of fluid must be drawn from the accumulator 16 of one fluid circuit 7, while the accumulator of the other fluid circuit 7 must accommodate a substantial amount of fluid. The accumulators 16 and their associated damper valves 13 therefore have a substantial effect of the damping and roll stiffness of the roll control system 1 when the flow control valve 26 is closed.

By comparison, in FIG. 6h, because the flow control valve 26 is open, the fluid flow is "short circuited" such that fluid is simply transferred between the upper and lower chambers 72, 73 of each wheel cylinder 8 with little to no fluid being drawn or supplied to each of the accumulators 16. In this arrangement, the accumulator 16 have no influence of the roll stiffness of the damping and roll control system 1.

Articulation

Figure 6I:
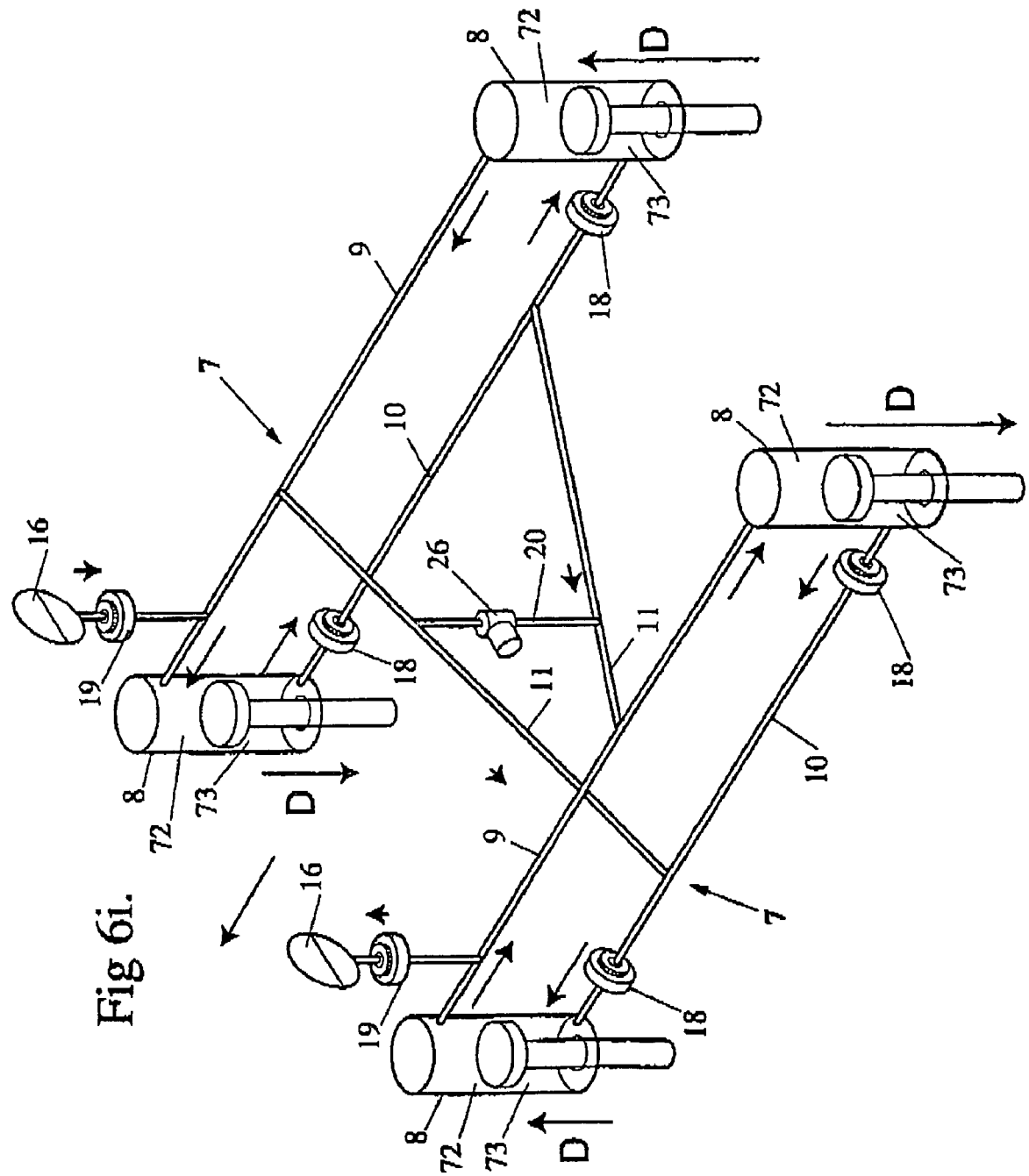

FIGS. 6i and 6j shows the fluid flows within the damping and roll control system 1 during articulation motion of the vehicle wheels. FIG. 6i shows the fluid flows when the flow control valve 26 is closed, FIG. 6j showing the fluid flow with the fluid control valve 26 open.

Referring to FIG. 6i, the wheel input D due to the articulation motion of the wheels simply result in the transfer of fluid between the upper chambers 72 and the lower chambers 73 of each pair of wheel cylinders 8 in each fluid circuit 7 with no transfer of fluid between the fluid circuits 7, by comparison, in FIG. 6j, the opening of the flow control valve 26 again results in "short circuiting" of the fluid flow such that there is simply a transfer of fluid between the upper and lower chambers 72, 73 of each wheel cylinder 8.

Any suspension system which includes an arrangement of interconnected fluid cylinders (such as the present invention) responds to inputs by producing forces which can be placed into four categories. The first is spring forces produced by compression or wind up of the fluid and/or mechanical springs in the system (and other sources of resilience such as hose expansion), this spring force being a function of the displacement of one or more of the fluid cylinders. The effect of the spring force is most noticeable at low frequencies.

The second category of forces is static friction forces which occur when wheel cylinder motion is initiated, or when the direction of motion is reversed. These static friction forces are often referred to as "stiction" forces or "breakout friction" forces and are due to the friction between the rod and piston seals and the respective rod and bore surfaces.

The third category of forces is damping forces which are a function of velocity. Primarily these damping forces are regulated by orifices, shims and springs in the damper valves 15, 18, 19. A component of the total system damping is generally provided by "line damping", ie. the flow of fluid along the conduits interconnecting the wheel cylinders in the system. The cross sectional areas of the wheel cylinders and the fluid conduits and the lengths of the fluid conduits should be designed to ensure that the level of line damping provided is of an acceptably low level for the different flows possible due to the motions of the suspension in the modes discussed above.

The fourth category of forces is the inertia forces, due primarily to the acceleration of the fluid through the system. Therefore, the inertia effect is most noticeable at high frequencies and may provide reduced isolation of high frequency inputs and sharp edge inputs resulting in body vibration and noise. Consider a theoretical system consisting of a cylinder with a piston area Ap connected to a line of length L and area Al and an incompressible fluid of density The cylinder piston is given an acceleration ρ. The resulting force, due the inertia of the fluid in the line, F is $$F = \frac{A_p^2}{A_l} \times L \times \rho \times a.$$

It can be seen that the inertia force is sensitive to fluid density (generally fixed for hydraulic fluids), line length and, line area and very sensitive to piston area. Any reduction in line length and increase in line area will reduce the fluid inertia effects. It is in practice more convenient to reduce the line length rather than increasing the line area by increasing the diameter of the fluid conduits. The latter change can lead to packaging difficulties under the vehicle because of the limited space available for installing the fluid conduits. Another beneficial change which can reduce fluid inertia effects is to increase the mechanical advantage (or lever ratio) from the wheels to the fluid cylinders. This can lead to higher peak pressures, but lower fluid accelerations.

The modes likely to be influenced by high frequency inputs are single wheel input and two wheel parallel bump input in the roll control system layout shown in FIGS. 1 to 6j, for a two wheel parallel bump input, fluid is required to travel from the front left upper chamber 51 to the front right lower chamber 52 along with fluid travel from the front right upper chamber 51 to the front left lower chamber 52. There is a minor flow into the accumulator 16 (see FIGS. 6d and 6e).

For a single wheel input fluid must travel from the cylinder chambers directly to the accumulator (see FIG. 5a to 6c).

With the fluid control valve 26 open, the two wheel parallel bump input flows are unchanged. For a single wheel input the flow now passes through the fluid control valve 26 with little flow to the accumulators 16.

In the above situations in the above-described roll control system layout, the fluid must travel down lines of a reasonable length and reasonable diameter. This provides a significant inertia effect.

As the system provides roll support and must provide a suitable roll moment distribution the front cylinders are generally a larger diameter than the rear. Due to the sensitivity to piston area the front is more likely to show fluid inertia effects than the rear.

The piston areas are further fixed by maximum required operating pressures.

Figure 7A:
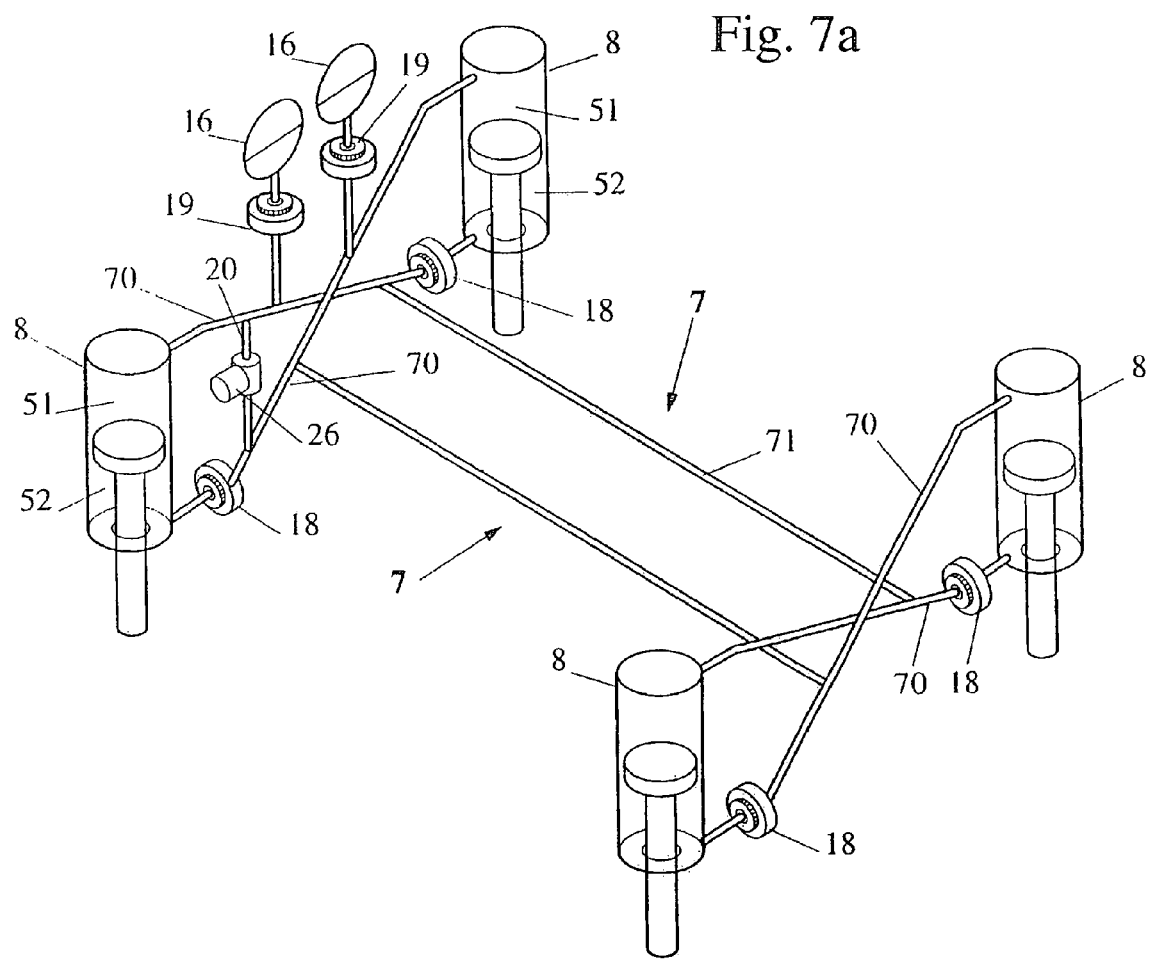
FIG. 7a is a schematic view of a third possible arrangement of a roll control system according to the present invention.
Figure 7B:
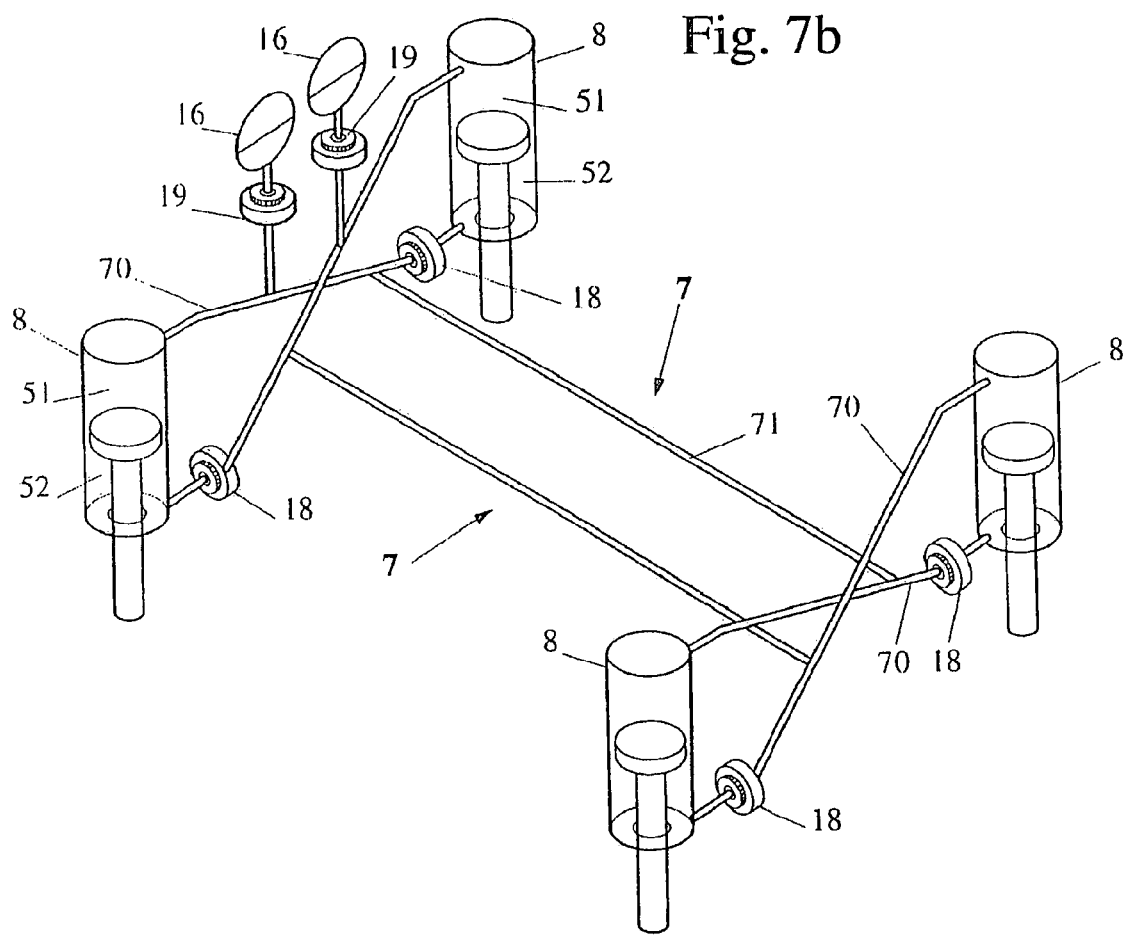

Another possible arrangement of the roll control system is shown in FIGS. 7a and 7b. The layout of the fluid circuits 7 is varied to provide for the shortest route from one front cylinder 8 to the other reducing line length and hence fluid inertia effects.

In particular, the upper chamber 81 of each adjacent pair of front wheel cylinders 8 are connected by a respective fluid conduit 70 to the lower chamber 52 of the adjacent front wheel cylinder 8. These fluid conduits 70 are connected to the corresponding fluid conduits 70 of the rear wheel cylinders by longitudinal fluid conduits 71 to provide a pair of fluid conduits of the system. During single wheel and two wheel bounce, much of the fluid is transferred between the fluid chambers 51 and 52 of each pair of front wheel cylinders 8 and/or between the fluid chambers 51 and 52 of each pair of rear wheel cylinders B.

Only a relatively small amount of fluid need pass through the longitudinal fluid conduits 71 where inertia effects are likely to be more pronounced. The opening of the flow control valve 26, as noted previously, results in short circuiting of the fluid circuits such that fluid is caused to flow between the upper and lower chambers 61 and 52 of the wheel cylinders 8.

Because the fluid inertia effects are likely to be more pronounced at the front as noted previously, accumulators may be provided on each of the fluid conduits 70 connecting the front wheel cylinder chambers 51 and 52. The accumulators 16 act to accommodate a large fluid flow resulting from a single wheel input when the flow control valve 26 is closed.

Figure 8A:
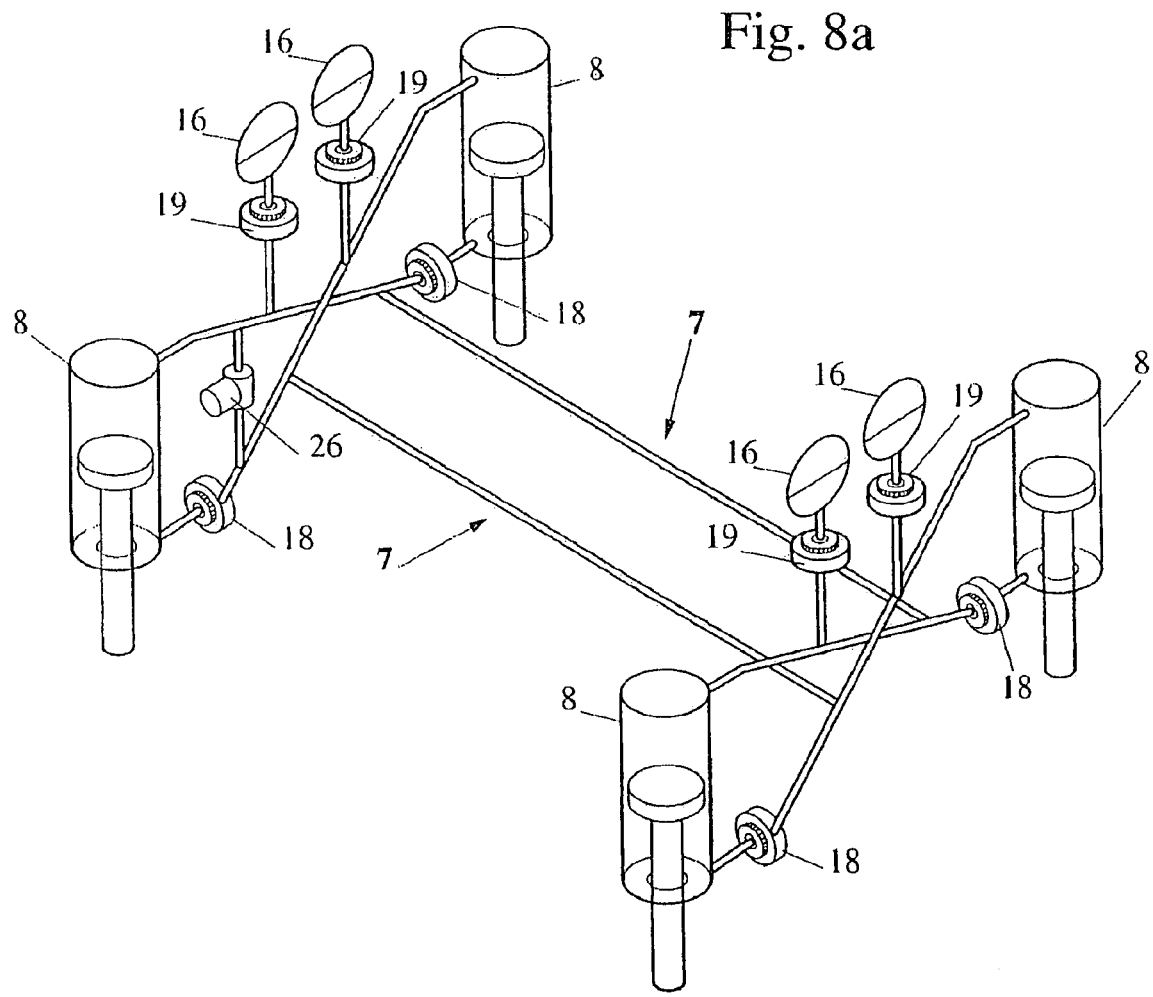
FIG. 8a is a schematic view of a fourth possible arrangement of a roll control system according to the present invention.

FIGS. 8a and 8b show a variation of the arrangement shown in FIG. 6, with further accumulators 16 being provided on each of the fluid conduits 70 connecting the rear fluid cylinder chambers 51 and 52.

Added accumulators 16 at the rear fluid conduits 70 allow fluid to generally bypass the longitudinal fluid conduit 70 resulting in less effective line length and reduced inertia effects.

The preferred embodiment of the roll control system shown in FIG. 9 is similar to the arrangement shown in FIGS. 1 and 2 except that the single bridge passage 20 and flow control valve 26 is replaced with a respective bridge passage 20 and flow control valve 26 for each wheel cylinder 8. This allows the fluid flow for each wheel cylinder 8 to be independently short circuited to allow for relatively direct flow between the upper and lower chambers 51 and 52 of the wheel cylinders 8.

Providing four separate bridge passages 20 and flow control valves located at each of the cylinders 8 therefore allows for a direct short circuit of the system. Most of the flow is bypassed directly around each cylinder 8 through a short and reasonable area line for all inputs with the flow control valve 26 open. This provides a significant reduction in the fluid inertia effects. The damping is however still maintained as the dampers 15,18 are in this fluid loop. Operation with the four flow control valves 28 closed will not however offer any fluid inertia improvements.

The flow control valves 26 could be digital (on or off only), multi-position or proportional depending on the level of damping control required. The valve 26 must seal when fully closed.

FIGS. 10a to 10c together illustrate another preferred embodiment of the roll control system similar to the embodiment shown in FIG. 1, but where the bridge passage 20 and roll control valve 26 is omitted (see FIG. 10c). Each wheel cylinder 8 is however adapted to include a fluid flow control assembly which allows for direct fluid flow between the upper and lower chambers 51 and 52 of each wheel cylinder 8.

The pistons 80 of each wheel cylinder have a control valve 81 inserted therein (see FIGS. 10b and 10c). The control valve 81 controls the rate of fluid through a piston passage 82 providing for fluid communication between the upper and lower chambers 51, 52 of the wheel cylinder 8. A rotary valve 81 is shown but any design is applicable. This rotary valve 811e rotatable by a shaft 83 passing through the piston rod 84 between an open position (FIG. 10b) and a closed position (FIG. 10c). Fluid flow between the upper and lower chambers 51, 52 is allowed when the valve 81 is open. This valve 81 directly connecting the upper and lower chamber of each cylinder thereby provides a short fluid path. Again fluid inertia effects are significantly reduced. An in-line damper 85 is required to damp the fluid flow through the piston passage 82 to thereby damp the wheel movement, as the dampers in the fluid conduits have effectively been bypassed. The valves 81 could be digital (on or off only), multi-position or proportional depending on the level of damping control required in comfort mode. The valve 81 must seal when fully closed. The construction of the valve may be different to that illustrate d, such as a disc with holes arranged in it and attached to the shaft 83. The piston may have spring steel shims on the holes on either side of the piston to provide damping control. The holes in the disc may be in the form of tapered slots to provide variable flow areas and therefore a degree of variable damping control.

FIG. 11 shows a preferred embodiment of the roll control system which utilises the fluid conduit layout of the system shown in FIG. 7, but further includes a respective flow control valve 26 for each wheel cylinder.

This layout minimises fluid inertia effects even when the flow control valves 26 are closed and provides a further reduction of fluid inertia effects with the flow control valves 26 open. It should however be appreciated that the flow control valves 26 could alternatively be inside the pistons 80 as shown in FIGS. 10b and 10c.

The preferred embodiment shown in FIG. 12 is the same as the arrangement shown in FIG. 11 but with additional rear accumulators 16 for the same reasons as in the arrangement shown in FIG. 8.

The invention claimed is:

1. A damping and roll control system for a vehicle suspension system, the vehicle having at least one pair of laterally spaced front wheel assemblies and at least one pair of laterally spaced rear wheel assemblies, each wheel assembly including a wheel and a wheel mounting locating the wheel to permit movement of the wheel in a generally vertical direction relative to a body of the vehicle, and vehicle support means for providing at least substantially a major portion of the support for the vehicle; the roll control system including:

wheel cylinders respectively locatable between each wheel mounting and the body of the vehicle, each wheel cylinder including an inner volume separated into first and second chambers by a piston supported within the wheel cylinder; and first and second fluid circuits respectively providing fluid communication between the wheel cylinders by fluid conduits, each of said fluid circuits providing fluid communication between the first chambers of the wheel cylinders on one side of the vehicle and the second chambers of the wheel cylinders on the opposite side of the vehicle to thereby provide roll support decoupled from a warp mode of the vehicle suspension system by providing a roll stiffness about a level roll attitude whilst simultaneously providing substantially zero warp stiffness;

and damper means are provided for controlling the rate of fluid flow directly into or out of at least one chamber of each wheel cylinder;

the damping and roll control system thereby providing substantially all of the damping of the vehicle suspension system.

2. A damping and roll control system according to claim 1, wherein the vehicle support means provides at least substantially all of the support for the vehicle.

3. A damping and roll control system according to claim 1, wherein the vehicle support means for at least one end of the vehicle include first support means, the first support means supporting at least a portion of the load on the wheels and contributing a roll stiffness to the vehicle suspension system.

4. A damping and roll control system according to claim 1, wherein the fluid circuit includes a first fluid conduit providing fluid communication between the first chambers of the wheel cylinders on one side of the vehicle, and a second fluid conduit providing fluid communication between the second chambers of the wheel cylinders on the opposite side of the vehicle, the first and second fluid conduits being in fluid communication.

5. A damping and roll control system according to claim 1, wherein each fluid circuit includes first and second diagonal fluid conduits, each respectively providing fluid communication between the first chamber of one wheel cylinder on one side of the vehicle and the second chamber of the diagonally opposite wheel cylinder on the other side of the vehicle, the first diagonal fluid conduit between one pair of diagonally opposite wheel cylinders being in fluid communication with the second diagonal fluid conduit between the other pair of diagonally opposite wheel cylinders.

6. A damping and roll control system according to claim 1, wherein each fluid circuit includes a front fluid conduit providing fluid communication between the wheel cylinders of the front wheel assemblies, and a rear fluid conduit providing fluid communication between the wheel cylinders of the rear wheel assemblies, with the front and rear conduits respectively providing fluid communication between the first chamber of the wheel cylinder at one side of the vehicle with the second chamber of the wheel cylinder at the opposite side of the vehicle, the front and rear conduits being in fluid communication.

7. A damping and roll control system according to claim 1, further including means for selectively providing fluid communication between the first and second fluid circuits.

8. A damping and roll control system according to claim 7, wherein said means includes at least one bridge passage connecting said first and second fluid circuits, and a flow control valve for controlling the flow through the bridge passage.

9. A damping and roll control system according to claim 8, further including an accumulator on the bridge passage.

10. A damping and roll control system according to claim 8, wherein a respective bridge passage and flow control valve is provided for each wheel cylinder.

11. A damping and roll control system according to claim 1, wherein the vehicle support means for at least one end of the vehicle include second support means, the second support means supporting at least a portion of the load on the wheels and providing substantially zero roll and warp stiffness.

12. A damping and roll control system for a vehicle suspension system, the vehicle having at least one pair of laterally spaced front wheel assemblies and at least one pair of laterally spaced rear wheel assemblies, each wheel assembly including a wheel and a wheel mounting locating the wheel to permit movement of the wheel in a generally vertical direction relative to a body of the vehicle, and vehicle support means for providing at least substantially a major portion of the support for the vehicle; the damping and roll control system including:
wheel cylinders respectively locatable between each wheel mounting and the body of the vehicle, each wheel cylinder including an inner volume separated into first and second chambers by a piston supported within the wheel cylinder;
first and second fluid circuits respectively providing fluid communication between the wheel cylinders by fluid conduits, each of said fluid circuits providing fluid communication between the first chambers of the wheel cylinders on one side of the vehicle and the second chambers of the wheel cylinders on the opposite side of the vehicle to thereby provide roll support decoupled from a warp mode of the vehicle suspension system by providing a roll stiffness about a level roll attitude whilst simultaneously providing substantially zero warp stiffness;
one or more fluid accumulators for each fluid circuit for providing roll resilience; and
damper means for controlling the rate of fluid flow directly into or out of at least one chamber of each wheel cylinder;
the damping and roll control system thereby providing substantially all of the damping of the vehicle suspension system.

13. A damping and roll control system according to claim 12, wherein the vehicle support means provides at least substantially all of the support for the vehicle.

14. A damping and roll control system according to claim 12, wherein the vehicle support means for at least one end of the vehicle include first support means, the first support means being independent for each wheel assembly and supporting at least a portion of the load on the wheels thereby contributing a roll stiffness to the vehicle suspension system.

15. A damping and roll control system according to claim 12, wherein the fluid circuit includes a first fluid conduit providing fluid communication between the first chambers of the wheel cylinders on one side of the vehicle, and a second fluid conduit providing fluid communication between the second chambers of the wheel cylinders on the opposite side of the vehicle, the first and second fluid conduits being in fluid communication.

16. A damping and roll control system according to claim 12, wherein each fluid circuit includes first and second diagonal fluid conduits, each respectively providing fluid communication between the first chamber of one wheel cylinder on one side of the vehicle and the second chamber of the diagonally opposite wheel cylinder on the other side of the vehicle, the first diagonal fluid conduit between one pair of diagonally opposite wheel cylinders being in fluid communication with the second diagonal fluid conduit between the other pair of diagonally opposite wheel cylinders.

17. A damping and roll control system according to claim 12, wherein each fluid circuit includes a front fluid conduit providing fluid communication between the wheel cylinders of the front wheel assemblies, and a rear fluid conduit providing fluid communication between the wheel cylinders of the rear wheel assemblies, with the front and rear conduits respectively providing fluid communication between the first chamber of the wheel cylinder at one side of the vehicle with the second chamber of the wheel cylinder at the opposite side of the vehicle, the front and rear conduits being in fluid communication.

18. A damping and roll control system according to claim 12, wherein the damper means are located at or in the wheel cylinders.

19. A damping and roll control system according to claim 12, wherein the damper means are located in the conduits.

20. A damping and roll control system according to claim 12, wherein the damper means are located in a manifold block, the manifold block providing fluid communication between the first and second conduits to form the first and second fluid circuits.

21. A damping and roll control system according to claim 12, wherein the damper means are bi-directional damper valves for controlling the fluid flow rate to and from at least one of the first or second chambers of each said wheel cylinder.

22. A damping and roll control system according to claim 12, further including bypass means for bypassing the damper means.

23. A damping and roll control system according to claim 12, wherein the damper means includes a single direction damper valve for controlling the fluid flow rate from each said chamber of each said wheel cylinder.

24. A damping and roll control system according to claim 23, wherein the single direction damper valve is used in parallel with a non-return valve.

25. A damping and roll control system according to claim 12, wherein each fluid circuit includes a second fluid accumulator, and a roll resilience switching valve located between the second accumulator and the fluid circuit for selectively communicating the second accumulator with said fluid circuit and thereby control the degree of roll resilience.

26. A damping and roll control system according to claim 12, wherein at least one of the accumulators or each fluid circuit includes an accumulator damper means for controlling the rate of fluid flow into and out of the accumulator.

27. A damping and roll control system according to claim 26, wherein a bypass passage is provided around the damper means for the accumulator, the bypass passage including a valve to open or close the bypass passage.

28. A damping and roll control system according to claim 12, wherein the damping and roll control system has a pressure precharge.

29. A damping and roll control system according to claim 12, wherein the wheel cylinders provide little to no support for the vehicle.

30. A damping and roll control system according to claim 12, further including means for selectively providing fluid communication between the first and second fluid circuits.

31. A damping and roll control system according to claim 12, wherein each wheel cylinder associated with at least one of said pair of laterally spaced wheel assemblies includes a piston rod extending respectively from opposing sides of the piston, the diameter of each piston rod being at least substantially equal, such that the effective piston area in the first and second chamber of each wheel cylinders are at least substantially equal.

32. A damping and roll control system according to claim 12, wherein each wheel cylinder associated with at least one of said pairs of laterally spaced wheels includes a hollow piston rod and an inner rod said hollow piston rod extending from one side of the piston through one chamber of the cylinder, said inner rod being supported within the other chamber of the wheel cylinder and at least partially accommodated within the hollow piston rod to form a rod chamber, the cylinder having a first annular chamber, a second annular chamber and the rod chamber.

33. A damping and roll control system according to claim 32, wherein the first chamber of the damping and roll control system is the first annular chamber and the second chamber of the damping and roll control system is the second annular chamber.

34. A damping and roll control system according to claim 32, wherein the first chamber of the damping and roll control system is the rod chamber and the second chamber of the damping and roll control system is the second annular chamber.

35. A damping and roll control system according to claim 34, wherein the second annular chamber has a larger effective piston area than the rod chamber.

36. A damping and roll control system according to claim 34, wherein the second annular chamber has the same effective piston area as the rod chamber.

37. A damping and roll control system according to claim 34, wherein the first annular chamber of the wheel cylinder forms part of a support circuit for the vehicle.

38. A damping and roll control system according to claim 12, further including selection means for selectively providing fluid communication between the first and second fluid circuits.

39. A damping and roll control system according to claim 38, wherein said selection means includes at least one bridge passage connecting said first and second fluid circuits, and a flow control valve for controlling the flow through the bridge passage.

40. A damping and roll control system according to claim 39, wherein a respective bridge passage and flow control valve is provided for each wheel cylinder.

41. A damping and roll control system according to claim 39, further including an accumulator on the bridge passage.

42. A damping and roll control system according to claim 41, wherein a respective bridge passage and flow control valve is provided for each wheel cylinder.

43. A damping and roll control system according to claim 38, wherein the piston of each wheel cylinder includes an integral flow control valve and damper valve for controlling the flow between the first and second chambers.

44. A damping and roll control system and according to claim 12, wherein the vehicle support means for at least one end of the vehicle include second support means, the second support means supporting at least a portion of the load on the wheels and providing substantially zero roll and warp stiffness.

45. A method of controlling the damping of a damping and roll control system for a vehicle suspension system, the roll control system including:
  wheel cylinders respectively locatable at wheel assemblies of the vehicle, each wheel cylinder including an inner volume separated into first and second chambers by a piston supported within the wheel cylinder; and
  first and second fluid circuits respectively providing fluid communication between the wheel cylinders by fluid conduits, each said fluid circuit providing fluid communication between the first chambers of the wheel cylinders on one side of the vehicle and the second chambers of the wheel cylinders on the opposite side of the vehicle to thereby provide roll support decoupled from the warp mode of the vehicle suspension system by providing a roll stiffness about a level roll attitude whilst simultaneously providing substantially zero warp stiffness;
  the method including bypassing fluid flow at least a substantial portion of the fluid conduits during predetermined wheel inputs to the damping and roll control system to thereby minimize line damping and/or fluid inertia effects on the damping of the damping and roll control system.

46. A method according to claim 45 including bypassing the fluid flow when there is a single wheel input or two wheel parallel bump input to the damping and roll control system.

47. A method according to claim 45 including entirely bypassing the fluid flow from the fluid conduits at said predetermined wheel inputs.

48. A method according to claim 45, wherein the damping and roll control system including damping means through which the bypassed fluid flows, the method including controlling the damping of the damping and roll control system by said damping means.

* * * * *

UNITED STATES PATENT AND TRADEMARK OFFICE
CERTIFICATE OF CORRECTION

PATENT NO. : 7,384,054 B2  Page 1 of 2
APPLICATION NO. : 10/890451
DATED : June 10, 2008
INVENTOR(S) : Christopher B. Heyring et al.

It is certified that error appears in the above-identified patent and that said Letters Patent is hereby corrected as shown below:

Title Page, insert item Notice:

-- This patent is subject to a terminal disclaimer based on
U.S. Patent Nos. 6,761,371 and 6,519,517 --;

Col. 4, line 13, "at" should be -- as --;

Col. 4, line 22, "vase" should be -- valve --;

Col. 6, line 9, "Inputs" should be -- inputs --;

Col. 8, line 8, "roil" should be -- roll --;

Col. 8, line 9, "ahead" should be -- head --;

Col. 8, line 51, "(east" should be -- least --;

Col. 9, line 54, "oil" should be -- roll --;

Col. 10, line 8, "mods" should be -- mode --;

Col. 10, line 26, "wheal" should be -- wheel --;

Col. 10, line 42, insert: -- Fig. 7b is a figure similar to Fig. 7a but
  without the bridge bypass 20 and bridge valve 26; --;

Col. 10, line 64, delete "in";

Col. 11, line 36, "onwards" should be -- onward --;

Col. 11, line 36-37, "arrangements" should be -- arrangements) --;

Signed and Sealed this

Seventeenth Day of August, 2010

David J. Kappos
*Director of the United States Patent and Trademark Office*

Col. 12, line 6, "wheal" should be -- wheel --;

Col. 12, line 11, "toll" should be -- coil --;

Col. 12, line 21, "unimpeding" should be -- unimpeded --;

Col. 12, line 24, "chambers 61" should be -- chambers 51 --;

Col. 12, line 25, delete "which";

Col. 12, line 46, "51 a" should be -- 61a --;

Col. 12, line 48, "61 a" should be -- 61a --;

Col. 12, line 61, "8j" should be -- 6j --;

Col. 13, line 6, "6C" should be -- 6c --;

Col. 13, line 27, "tight" should be -- right --;

Col. 13, line 30, "of" should be -- or --;

Col. 14, line 5, "Fig. 8d" should be -- Fig. 6d --;

Col. 14, line 18, "cylinder B" should be -- cylinder 8 --;

Col. 14, line 23, "right" should be -- roll --;

Col. 14, line 40, "flaw" should be -- flow --;

Col. 14, line 45, "valves 13" should be -- valves 19 --;

Col. 15, line 39, "A$p$" should be -- A$\rho$ --;

Col. 15, line 40, after "density" insert -- - $\rho$ --;

Col. 15, line 41, "$p$" should be -- a --;

Col. 15, line 42, after "due" insert -- to --;

Col. 16, line 5, "5a" should be -- 6a --;

Col. 16, line 28, "chamber 81" should be -- chamber 51 --;